(12) United States Patent
Boratav et al.

(10) Patent No.: US 11,053,153 B2
(45) Date of Patent: Jul. 6, 2021

(54) FORMING BODIES FOR FORMING CONTINUOUS GLASS RIBBONS AND GLASS FORMING APPARATUSES COMPRISING THE SAME

(71) Applicant: Corning Incorporated, Corning, NY (US)

(72) Inventors: Olus Naili Boratav, Ithaca, NY (US); Timothy L Lansberry, Watkins Glen, NY (US); Steven Michael Milillo, State College, PA (US)

(73) Assignee: CORNING INCORPORATED, Corning, NY (US)

( * ) Notice: Subject to any disclaimer, the term of this patent is extended or adjusted under 35 U.S.C. 154(b) by 87 days.

(21) Appl. No.: 16/090,413

(22) PCT Filed: Apr. 5, 2017

(86) PCT No.: PCT/US2017/026145
§ 371 (c)(1),
(2) Date: Oct. 1, 2018

(87) PCT Pub. No.: WO2017/176883
PCT Pub. Date: Oct. 12, 2017

(65) Prior Publication Data
US 2019/0119139 A1    Apr. 25, 2019

Related U.S. Application Data

(60) Provisional application No. 62/319,419, filed on Apr. 7, 2016, provisional application No. 62/376,994, filed on Aug. 19, 2016.

(51) Int. Cl.
*C03B 17/06* (2006.01)

(52) U.S. Cl.
CPC ........ *C03B 17/064* (2013.01); *C03B 2201/40* (2013.01); *Y02P 40/57* (2015.11)

(58) Field of Classification Search
CPC .................................................... C03B 17/064
See application file for complete search history.

(56) References Cited

U.S. PATENT DOCUMENTS

| | | | | |
|---|---|---|---|---|
| 1,772,448 | A | * | 8/1930 | Allen .................... C03B 17/064 65/195 |
| 1,872,550 | A | * | 8/1932 | Allen .................... C03B 17/064 65/195 |

(Continued)

FOREIGN PATENT DOCUMENTS

CN      101067565 A     11/2007
EP       1765737 B1      3/2011

(Continued)

OTHER PUBLICATIONS

International Search Report and Written Opinion of the International Searching Authority; PCT/US2017/026145; dated Jul. 19, 2017; 11 Pages; Korean Patent Office.

(Continued)

*Primary Examiner* — Jason L Lazorcik

(57) ABSTRACT

According to one embodiment, a forming body of a glass forming apparatus may include an upper portion with a first forming surface and a second forming surface extending from the upper portion. The first forming surface and the second forming surface may converge at a bottom edge of the forming body. A trough for receiving molten glass may be positioned in the upper portion of the forming body. The trough may include a first weir, a second weir opposite from and spaced apart from the first weir, and a base extending between the first weir and the second weir. At least a portion of a vertical surface of the first weir may curve inward towards a centerline of the trough. Similarly, at least a (Continued)

portion of a vertical surface of the second weir may curve inward towards the centerline of the trough.

20 Claims, 21 Drawing Sheets

(56) References Cited

U.S. PATENT DOCUMENTS

| | | | |
|---|---|---|---|
| 3,451,798 A * | 6/1969 | Simon | C03B 17/064 65/199 |
| 3,579,318 A * | 5/1971 | Ward | C03B 17/064 65/90 |
| 6,748,765 B2 | 6/2004 | Pitbladdo | |
| 6,974,786 B2 | 12/2005 | Helfinstine et al. | |
| 6,997,017 B2 | 2/2006 | Pitbladdo | |
| 8,001,805 B2 | 8/2011 | Pitbladdo | |
| 8,661,850 B2 | 3/2014 | Pitbladdo | |
| 8,720,225 B2 | 5/2014 | Pitbladdo | |
| 9,758,418 B1 * | 9/2017 | El-Kahlout | C03B 17/067 |
| 2001/0039814 A1 * | 11/2001 | Pitbladdo | C03B 17/064 65/53 |
| 2005/0183455 A1 * | 8/2005 | Pitbladdo | C03B 17/064 65/29.11 |
| 2007/0068197 A1 * | 3/2007 | Pitbladdo | C03B 17/067 65/90 |
| 2009/0013725 A1 * | 1/2009 | Kano | C03B 7/02 65/99.1 |
| 2009/0019892 A1 * | 1/2009 | Fredholm | C03B 17/06 65/91 |
| 2009/0314032 A1 * | 12/2009 | Tomamoto | C03B 17/067 65/29.14 |
| 2010/0031702 A1 * | 2/2010 | Tomamoto | C03B 17/068 65/91 |
| 2010/0122556 A1 * | 5/2010 | Kin | C03B 17/064 65/90 |
| 2010/0251774 A1 | 10/2010 | Peterson | |
| 2011/0045239 A1 * | 2/2011 | Takaya | C03B 17/02 428/138 |
| 2011/0236633 A1 | 9/2011 | Takaya et al. | |
| 2012/0006059 A1 | 1/2012 | Dejenka et al. | |
| 2012/0227445 A1 * | 9/2012 | Citti | C03B 17/064 65/53 |
| 2012/0260696 A1 * | 10/2012 | Citti | C04B 35/10 65/53 |
| 2012/0263929 A1 * | 10/2012 | Citti | C04B 41/009 428/212 |
| 2013/0102228 A1 | 4/2013 | Tsuda et al. | |
| 2013/0217563 A1 * | 8/2013 | Citti | C04B 35/117 501/96.3 |
| 2015/0000345 A1 * | 1/2015 | Jiao | G01B 9/02091 65/158 |
| 2015/0158753 A1 | 6/2015 | Milillo et al. | |
| 2015/0353408 A1 | 12/2015 | Nishimura | |
| 2018/0093924 A1 * | 4/2018 | Fourcade | C04B 35/62685 |
| 2019/0276365 A1 * | 9/2019 | Fourcade | C04B 35/481 |
| 2019/0284082 A1 * | 9/2019 | Boratav | C03B 17/064 |

FOREIGN PATENT DOCUMENTS

| | | | | |
|---|---|---|---|---|
| JP | 2009-509896 A | 3/2009 | | |
| JP | 2009-519884 A | 5/2009 | | |
| JP | 2013-234107 A | 11/2013 | | |
| JP | 2015-528792 A | 10/2015 | | |
| TW | 200407269 A | 5/2004 | | |
| TW | 200922885 A | 6/2009 | | |
| TW | 201134774 A | 10/2011 | | |
| TW | 201200476 A | 1/2012 | | |
| TW | 201235313 A | 9/2012 | | |
| TW | 201439017 A | 10/2014 | | |
| WO | 2009011792 A1 | 1/2009 | | |
| WO | 2010024937 A2 | 3/2010 | | |
| WO | WO-2016133798 A1 * | 8/2016 | | C03B 17/064 |
| WO | WO-2016201055 A1 * | 12/2016 | | C03B 17/064 |
| WO | WO-2017087463 A1 * | 5/2017 | | C03B 17/064 |
| WO | WO-2019027893 A1 * | 2/2019 | | C03C 3/087 |

OTHER PUBLICATIONS

Taiwanese Patent Application No. 106111503, Search Report dated Sep. 28, 2020, 1 page (English Translation Only); Taiwanese Patent Office.
Japanese Patent Application No. 2018-552070, Office Action dated Mar. 30, 2021, 6 pages (3 pages of English Translation and 3 pages of Original Document); Japanese Patent Office.
Taiwanese Patent Application No. 106111503, Notice of Allowance dated Jan. 21, 2021; 3 pages (English Translation Only); Taiwanese Patent Office.
Chinese Patent Application No. 201780022424.X, Office Action dated Mar. 5, 2021, 5 pages (English Translation Only); Chinese Patent Office.

* cited by examiner

FORMING BODIES FOR FORMING CONTINUOUS GLASS RIBBONS AND GLASS FORMING APPARATUSES COMPRISING THE SAME

This application claims the benefit of priority under 35 U.S.C. § 371 of International Application No. PCT/US17/26145, filed on Apr. 5, 2017, which claims the benefit of priority under 35 U.S.C. § 119 of U.S. Provisional Application Ser. No. 62/319,419 filed on Apr. 7, 2016 and Provisional Application Ser. No. 62/376,994 filed on Aug. 19, 2016, the content of which are relied upon and incorporated herein by reference in their entirety

BACKGROUND

Field

The present specification generally relates to forming bodies for use in the production of continuous glass ribbons and, more specifically, to forming bodies that mitigate bowing of the weirs of the forming bodies.

Technical Background

The fusion process is one technique for forming glass ribbons. Compared to other processes for forming glass ribbons, such as the float and slot-draw processes, the fusion process produces glass ribbons with a relatively low amount of defects and with surfaces having superior flatness. As a result, the fusion process is widely employed for the production of glass substrates that are used in the manufacture of LED and LCD displays and other substrates that require superior flatness and smoothness.

In the fusion process molten glass is fed into a forming body (also referred to as an isopipe), which includes forming surfaces that converge at a root. The molten glass evenly flows over the forming surfaces of the forming body and forms a ribbon of flat glass with pristine surfaces that is drawn from the root of the forming body.

The forming body is generally made of refractory materials, such as refractory ceramics, which are generally able to withstand the relatively high temperatures of the fusion process. However, the mechanical properties of even the most temperature-stable refractory ceramics may degrade over extended periods of time at elevated temperatures, potentially resulting in the degradation of the characteristics of the glass ribbon produced therefrom or even failure of the forming body. Either case may result in disruption of the fusion process, lower product yields, and increased production costs.

Accordingly, a need exists for alternative methods and apparatuses for mitigating the degradation of forming bodies of glass forming apparatuses.

SUMMARY

A forming body of a glass forming apparatus is disclosed comprising an upper portion, a first forming surface and a second forming surface extending from the upper portion, the first forming surface and the second forming surface converging at a bottom edge of the forming body and a trough for receiving molten glass positioned in the upper portion of the forming body, the trough defined by a first weir, a second weir opposite from and spaced apart from the first weir, and a base extending between the first weir and the second weir. At least a portion of a vertical surface of the first weir curves inward toward a centerline of the trough and at least a portion of a vertical surface of the second weir curves inward toward the centerline of the trough.

The vertical surface of the first weir may be an inner vertical surface of the first weir, the first weir further comprising an outer vertical surface opposite the inner vertical surface of the first weir and at least a portion of the outer vertical surface of the first weir curves inward toward the centerline of the trough; and the vertical surface of the second weir may be an inner vertical surface of the second weir, the second weir further comprising an outer vertical surface opposite the inner vertical surface of the second weir and at least a portion of the outer vertical surface of the second weir curves inward toward the centerline of the trough. The portion of the inner vertical surface of the first weir and the portion of the outer vertical surface of the first weir that curve inward toward the centerline of the trough may be located between a first end of the forming body and a midpoint of a length L of the upper portion of the forming body; and the portion of the inner vertical surface of the second weir and the portion of the outer vertical surface of the second weir that curve inward toward the centerline of the trough can be located between the first end of the forming body and the midpoint of the length L of the upper portion of the forming body.

The vertical surface of the first weir may be an inner vertical surface of the first weir wherein the first weir further comprises an outer vertical surface opposite the inner vertical surface of the first weir, and wherein the outer vertical surface of the first weir is substantially planar; and the vertical surface of the second weir may be an inner vertical surface of the second weir wherein the second weir further comprises an outer vertical surface opposite the inner vertical surface of the second weir, and wherein the outer vertical surface of the second weir is substantially planar.

The portion of the inner vertical surface of the first weir that curves inward toward the centerline of the trough can be located between a first end of the forming body and a midpoint of a length L of the upper portion of the forming body; and the portion of the inner vertical surface of the second weir that curves inward toward the centerline of the trough can be located between the first end of the forming body and the midpoint of the length L of the upper portion of the forming body.

The vertical surface of the first weir may be an outer vertical surface of the first weir wherein the first weir further comprises an inner vertical surface opposite the outer vertical surface of the first weir, and wherein the inner vertical surface of the first weir is substantially planar; and the vertical surface of the second weir may be an outer vertical surface of the second weir wherein the second weir further comprises an inner vertical surface opposite the outer vertical surface of the second weir, and wherein the inner vertical surface of the second weir is substantially planar.

The portion of the outer vertical surface of the first weir that curves inward toward the centerline of the trough may be located between a first end of the forming body and a midpoint of a length L of the upper portion of the forming body; and the portion of the outer vertical surface of the second weir that curves inward toward the centerline of the trough may be located between the first end of the forming body and the midpoint of the length L of the upper portion of the forming body.

The forming body trough may in some embodiments be a first trough, wherein the forming body further comprises a second trough positioned in the base of the first trough.

The second trough can extend from a first end of the forming body toward an opposite end of the forming body to a point that is less than or equal to a midpoint M of a length L of the forming body.

The second trough may extend from the first end of the forming body toward the opposite end of the forming body to a point that is less than or equal to ⅓ of the length L of the forming body.

The forming body may further comprise a yoke block coupled to the first weir and the second weir and extending across the trough. For example, the yoke block may comprise first and second slots and the first weir and the second weir are positioned in the first slot and second slot, respectively.

The forming body may further comprise a restraining block positioned on the yoke block, the yoke block positioned within a slot of the restraining block.

The first weir and the second weir of the forming body may be compressed in a longitudinal, or length direction, of the forming body.

In some embodiments, a thickness of the first weir may vary along a length of the forming body; and a thickness of the second weir may vary along a length of the forming body.

In embodiments, a first thickness of the first weir proximate a first end of the forming body may be greater than a second thickness of the first weir at a midpoint of the forming body; and a first thickness of the second weir proximate the first end of the forming body may be greater than a second thickness of the second weir at the midpoint of the forming body.

A transition from the first thickness of the first weir to the second thickness of the first weir may comprise a radius; and a transition from the first thickness of the second weir to the second thickness of the second weir may comprise a radius. That is, the transitions from the first thicknesses of the first and second weirs to the second thicknesses of the first and second weirs, respectively, may be curved.

In some embodiments, a thickness of the first weir may vary along a vertical downward direction from a top of the first weir; and a thickness of the second weir may vary along the vertical downward direction from a top of the second weir. For example, the thickness of the first weir may decrease linearly in the downward vertical direction; and the thickness of the second weir may decrease linearly in the downward vertical direction.

In another embodiment, a forming body of a glass forming apparatus is described comprising an upper portion, a first forming surface and a second forming surface extending from the upper portion, the first forming surface and the second forming surface converging at a bottom edge of the forming body and a first trough for receiving molten glass positioned in the upper portion of the forming body, the first trough defined by a first weir, a second weir opposite from and spaced apart from the first weir, and a base extending between the first weir and the second weir. The forming body may further comprise a second trough positioned in the base of the first trough, the second trough comprising a second trough width that is less than a width of the first trough.

The second trough can extend from a first end of the first trough to a point less than or equal to a midpoint of a length L of the forming body. For example, the second trough may extend from the first end of the forming body toward the opposite end to a point that is less than or equal to ⅓ of the length L of the forming body.

The forming body may further comprise a yoke block coupled to the first weir and the second weir and extending across the first trough.

The yoke block can comprise first and second slots configured to receive the first and second weirs, respectively.

The forming body may still further comprise a restraining block positioned on the yoke block, the yoke block positioned within a slot of the restraining block.

In embodiments, the first weir and the second weir can be compressed in a longitudinal direction of the forming body.

In some embodiments, a thickness of the first weir can vary along a length of the forming body; and a thickness of the second weir may vary along the length of the forming body. For example, a first thickness of the first weir proximate a first end of the forming body can be greater than a second thickness of the first weir at a midpoint of the forming body; and a first thickness of the second weir proximate the first end of the forming body can be greater than a second thickness of the second weir at the midpoint of the forming body.

In embodiments, a transition from the first thickness of the first weir to the second thickness of the first weir may comprise a radius (include curvature); and a transition from the first thickness of second first weir to the second thickness of the second weir may comprise a radius.

In some embodiments, the thickness of the first weir may vary along a vertical downward direction from a top of the first weir; and the thickness of the second weir may vary along the vertical downward direction from a top of the second weir.

In still other embodiments, a forming body of a glass forming apparatus is disclosed comprising an upper portion, a first forming surface and a second forming surface extending from the upper portion, the first forming surface and the second forming surface converging at a root and a trough for receiving molten glass positioned in the upper portion of the forming body, the trough defined by a first weir, a second weir opposite from and spaced apart from the first weir, and a base extending between the first weir and the second weir. A thickness of the first weir may vary along a length of the forming body, and a thickness of the second weir may vary along the length of the forming body. Additionally, the first weir and the second weir can be compressed in a length direction of the forming body.

In some embodiments, a first thickness of the first weir proximate a first end of the forming body can be greater than a second thickness of the first weir at a midpoint of the forming body; and a first thickness of the second weir proximate the first end of the forming body may be greater than a second thickness of the second weir at the midpoint of the forming body.

In embodiments, a transition from the first thickness of the first weir to the second thickness of the first weir may comprise a radius; and a transition from the first thickness of second first weir to the second thickness of the second weir may comprise a radius.

In some embodiments, the thickness of the first weir may vary along a vertical downward direction from a top of the first weir; and the thickness of the second weir may vary along the vertical downward direction from a top of the second weir.

The forming body may further comprise a yoke block coupled to the first weir and the second weir and extending across the trough. For example, the yoke block may comprise first and second slots configured to receive the first and second weirs, respectively.

The forming body may still further comprise a restraining block positioned on the yoke block, the yoke block positioned within a slot of the restraining block.

In yet still other embodiments, a forming body of a glass forming apparatus is described comprising an upper portion, a first forming surface and a second forming surface extending from the upper portion, the first forming surface and the second forming surface converging at a bottom edge of the forming body and a trough for receiving molten glass positioned in the upper portion of the forming body, the trough defined by a first weir, a second weir opposite from and spaced apart from the first weir, and a base extending between the first weir and the second weir. The forming body may further comprise a yoke block, comprising a first slot and a second slot, coupled to the first weir and the second weir and extending across the trough, the first weir and the second weir positioned in the first slot and the second slot, respectively.

According to other embodiments, a forming body of a glass forming apparatus may include an upper portion with a first forming surface and a second forming surface extending from the upper portion. The first forming surface and the second forming surface may converge at a root. A trough for receiving molten glass may be positioned in the upper portion of the forming body. The trough may have a first weir, a second weir opposite from and space apart from the first weir, and a base extending between the first weir and the second weir. An angle between at least a portion of an interior surface of the first weir and the base of the trough may be less than 90°. An angle between at least a portion of an interior surface of the second weir and the base of the trough may be less than 90°.

In some embodiments, a width of the trough between the interior surface of the first weir at a top of the first weir and the interior surface at a top of the second weir may be greater at a compression end of the forming body than at an inlet end of the forming body.

In some embodiments, a width of the trough between the interior surface at a top of the first weir and the interior surface at a top of the second weir at a compression end of the forming body may be equal to the width of the trough between the interior surface at the top of the first weir and the interior surface at the top of the second weir at an inlet end of the forming body.

In embodiments, an exterior surface of the first weir is substantially parallel with the interior surface of the first weir and an exterior surface of the second weir may be substantially parallel with the interior surface of the second weir.

In some embodiments, at least a portion of an exterior surface of the first weir may be non-parallel with the interior surface of the first weir and at least a portion of an exterior surface of the second weir may be non-parallel with the interior surface of the second weir.

In embodiments, a thickness of the first weir at the base may be equal to the thickness at a top of the first weir and a thickness of the second weir at the base may be equal to the thickness at a top of the second weir.

In embodiments, a thickness of at least a portion of the first weir may be greater at a top of the first weir than at the base and a thickness of at least a portion of the second weir may be greater at a top of the second weir than at the base.

In embodiments, an exterior surface of the first weir extends to the first forming surface and at least a portion of the exterior surface of the first weir may be inclined towards the trough of the forming body with respect to vertical and an exterior surface of the second weir extends to the second forming surface and at least a portion of the exterior surface of the second weir may be inclined towards the trough of the forming body with respect to vertical. Additional features and advantages of the glass forming apparatuses described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 2A:
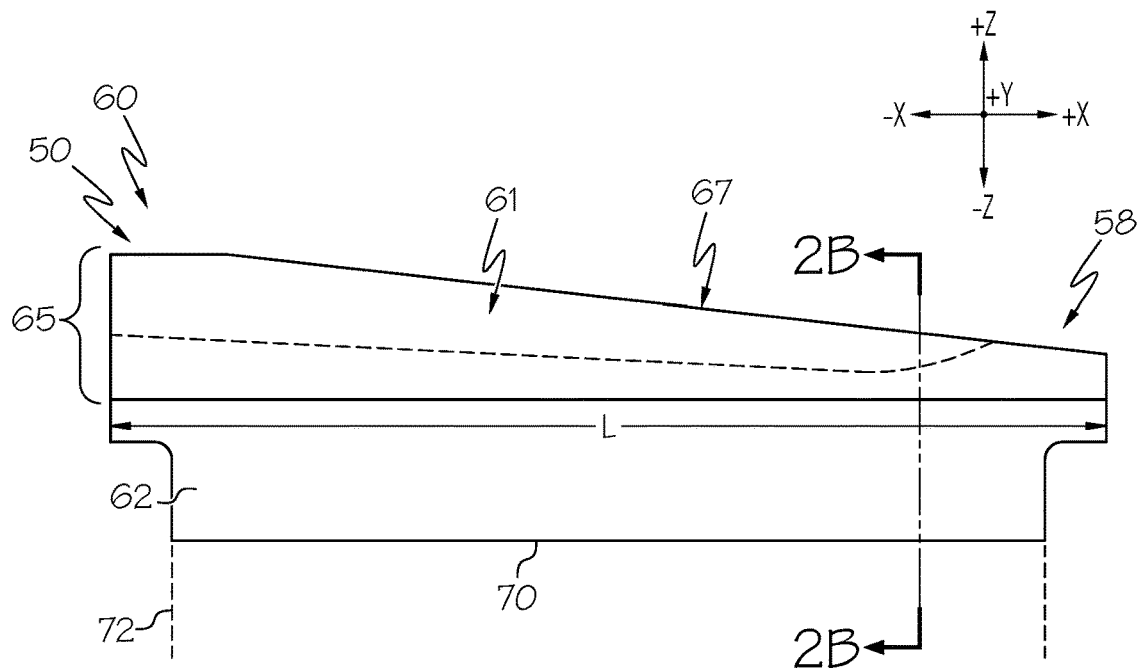
FIG. 2A schematically depicts a forming body of the glass forming apparatus of FIG. 1.
Figure 2B:
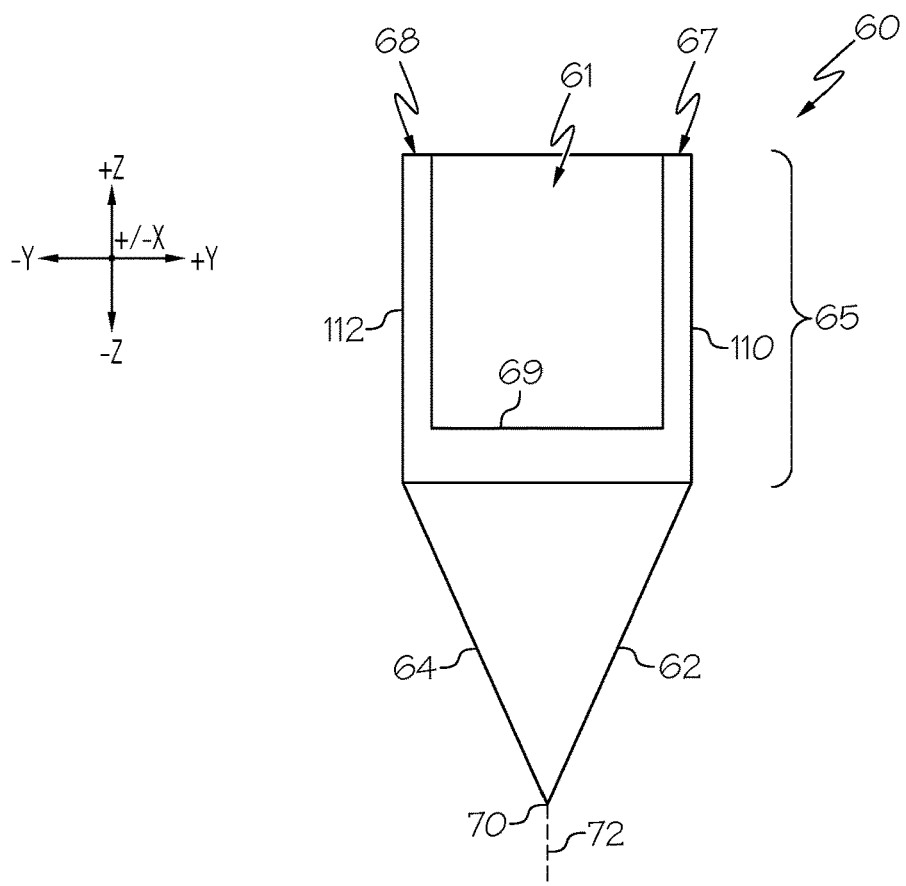
FIG. 2B schematically depicts a cross section of the forming body of FIG. 2A.

Reference will now be made in detail to embodiments of forming bodies for glass forming apparatuses, examples of which are illustrated in the accompanying drawings. Whenever possible, the same reference numerals will be used throughout the drawings to refer to the same or like parts. One embodiment of a forming body 60 of a glass forming apparatus is schematically depicted in FIGS. 2A and 2B. In this embodiment, the forming body 60 of a glass forming apparatus may include an upper portion 65 with a first forming surface 62 and a second forming surface 64 extending from the upper portion 65. The first forming surface 62 and the second forming surface 64 may converge at a bottom edge (root) 70. A trough 61 for receiving molten glass may be positioned in the upper portion 65 of the forming body 60. The trough 61 may include a first weir 67, a second weir 68 opposite from and spaced apart from the first weir 67, and a base 69 extending between the first weir 67 and the second weir 68. At least a portion of a vertical surface 110 of the first weir 67 may curve inward towards a centerline of the trough 61. Similarly, at least a portion of a vertical surface 112 of the second weir 68 may curve inward towards the centerline of the trough 61. Various embodiments of glass forming apparatuses will be described in further detail herein with specific reference to the appended drawings.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
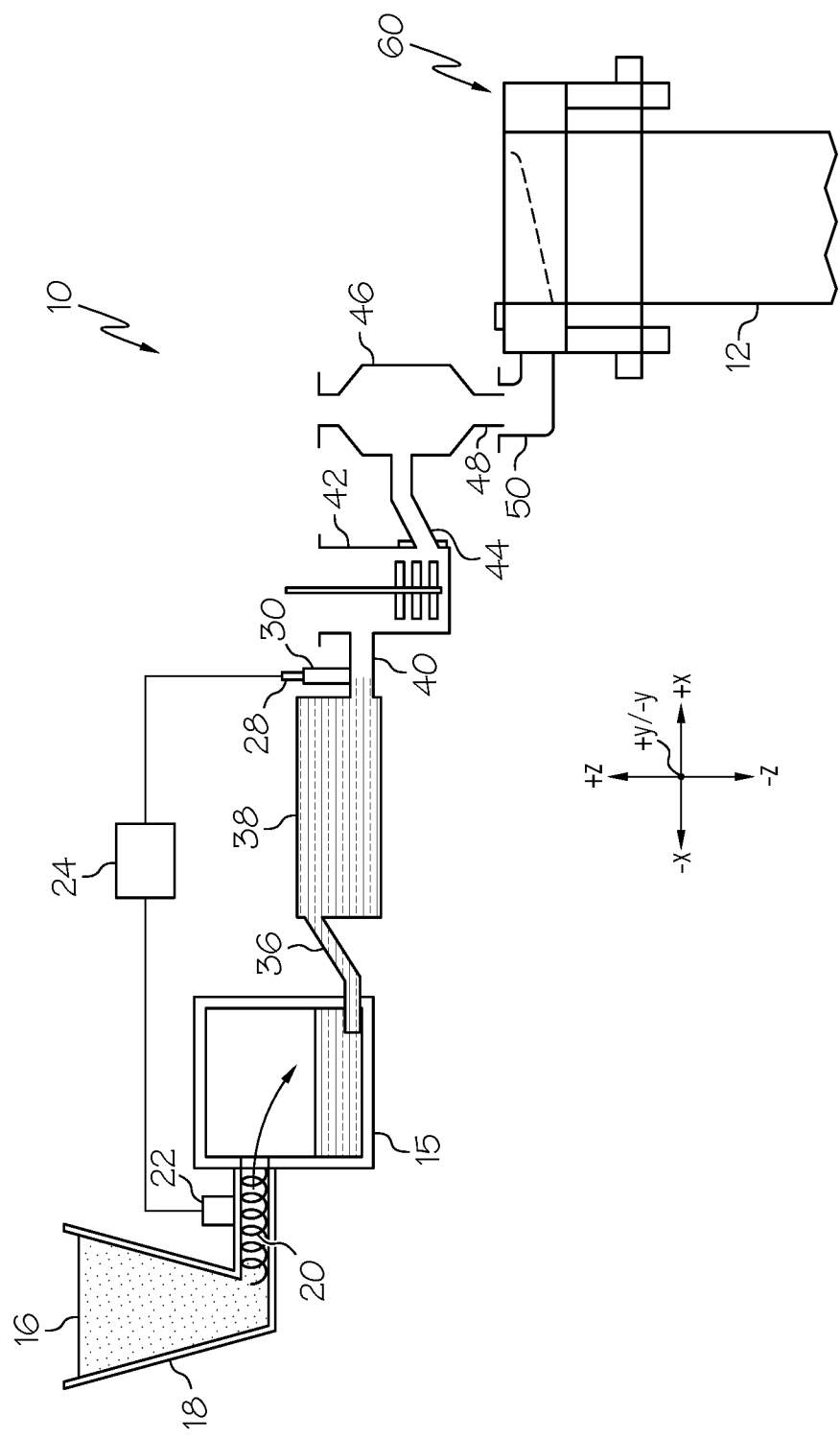
FIG. 1 schematically depicts an embodiment of a glass forming apparatus, according to one or more embodiments shown and described herein.

Referring now to FIG. 1, a glass forming apparatus 10 for making glass articles, such as a continuous glass ribbon 12, is schematically depicted. The glass forming apparatus 10 may generally include a melting vessel 15 that receives batch material 16 from a storage bin 18. The batch material 16 can be introduced to the melting vessel 15 by a batch delivery device 20 powered by a motor 22. An optional controller 24 may be provided to activate the motor 22 and a molten glass level probe 28 can be used to measure the glass melt level within a standpipe 30 and communicate the measured information to the controller 24.

The glass forming apparatus 10 can also include a fining vessel 38, such as a fining tube, coupled to the melting vessel 15 by way of a first connecting tube 36. A mixing vessel 42 is coupled to the fining vessel 38 with a second connecting tube 40. A delivery vessel 46 is coupled to the mixing vessel 42 with a delivery conduit 44. As further illustrated, a downcomer 48 is positioned to deliver glass melt from the delivery vessel 46 to an inlet end 50 of a forming body 60. In the embodiments shown and described herein, the forming body 60 is a fusion-forming vessel that may also be referred to as an isopipe.

The melting vessel 15 is typically made from a refractory material, such as refractory (e.g., ceramic) brick. The glass forming apparatus 10 may further include components that are typically made from electrically conductive refractory metals such as, for example, platinum or platinum-containing metals such as platinum-rhodium, platinum-iridium and combinations thereof. Such refractory metals may also include molybdenum, palladium, rhenium, tantalum, titanium, tungsten, ruthenium, osmium, zirconium, and alloys thereof and/or zirconium dioxide. The platinum-containing components can include one or more of the first connecting tube 36, the fining vessel 38, the second connecting tube 40, the standpipe 30, the mixing vessel 42, the delivery conduit 44, the delivery vessel 46, the downcomer 48 and the inlet end 50.

Referring now to FIGS. 2A and 2B, the forming body 60 generally includes a trough 61, a first forming surface 62, and a second forming surface 64. The trough 61 is located in the upper portion 65 of the forming body 60 and comprises a first weir 67, a second weir 68, and a base 69. The trough may vary in depth as a function of length along the forming body. The first forming surface 62 and the second forming surface 64 extend from the upper portion 65 of the forming body 60 in a vertically downward direction (i.e., the −Z direction of the coordinate axes depicted in the figures) and converge towards one another, joining at a lower (bottom) edge of the forming body, which may also be referred to as the root 70. Accordingly, it should be understood that the first forming surface 62 and the second forming surface 64 can, in some embodiments, form an inverted isosceles (or equilateral) triangle extending from the upper portion 65 of the forming body 60 with the root 70 forming the lowermost vertex of the triangle in the downstream direction. A draw plane 72 generally bisects the root 70 in the +/−Y directions of the coordinate axes depicted in the figures and extends in the vertically downward direction.

Referring now to FIGS. 1-2B, in operation, batch material 16, specifically batch material for forming glass, is fed from the storage bin 18 into the melting vessel 15 with the batch delivery device 20. The batch material 16 is melted into molten glass in the melting vessel 15. The molten glass passes from the melting vessel 15 into the fining vessel 38 through the first connecting tube 36. Dissolved gasses, which may result in glass defects, are removed from the molten glass in the fining vessel 38. The molten glass then passes from the fining vessel 38 into the mixing vessel 42 through the second connecting tube 40. The mixing vessel 42 homogenizes the molten glass, such as by stirring, and the homogenized molten glass passes through the delivery conduit 44 to the delivery vessel 46. The delivery vessel 46 discharges the homogenized molten glass through downcomer 48 and into the inlet end 50 of the forming body, which in turn passes the homogenized molten glass into the trough 61 of the forming body 60 toward the compression end 58 of the forming body 60.

The homogenized molten glass fills the trough 61 of the forming body 60 and ultimately overflows, flowing over the first weir 67 and second weir 68 of the upper portion 65 of the forming body 60 along its length L and then in the vertically downward direction. The homogenized molten glass flows from the upper portion 65 of the forming body 60 and onto the first forming surface 62 and the second forming surface 64. Streams of homogenized molten glass flowing over the first forming surface 62 and the second forming surface 64 join and fuse together at the root 70, forming a glass ribbon 12 that is drawn on the draw plane 72 in the downstream direction by pulling rolls (not shown). The glass ribbon 12 may be further processed downstream of the forming body 60 such as by segmenting the glass ribbon 12 into discrete glass sheets, rolling the glass ribbon 12 upon itself, and/or applying one or more coatings to the glass ribbon 12.

The forming body 60 is typically formed from refractory ceramic materials that are chemically compatible with the molten glass and capable of withstanding the high temperatures associated with the fusion forming process, although in further embodiments, portions of the forming body, or the entire forming body may be formed of other materials, for example metallic materials. Typical ceramic refractory materials from which the forming body can be formed include, without limitation, zircon (e.g., zirconia), silicon carbide, xenotime, and/or alumina based refractory ceramics. The mass of the molten glass flowing into the trough 61 of the forming body 60 exerts an outward pressure on the weirs 67, 68. This pressure, combined with the elevated temperature creep of the refractory ceramic materials that the forming body 60 is made from, can cause the weirs to bow progressively outward (i.e., in the +/−Y directions of the coordinate axes depicted in FIGS. 2A and 2B) over the course of a glass drawing campaign, which may span a period of several years.

The outward bowing, which may be non-uniform along the length L of the forming body 60, may be most pronounced in the first ⅓ of the length L of the forming body 60 from the inlet end, e.g., inlet end 50 where the trough 61 is deepest. The outward bowing of the weirs may significantly alter the glass distribution within the trough 61, reducing glass flow over the weirs 67, 68 where the bowing is most pronounced, and increasing glass flow over the weirs 67, 68 where the bowing is less pronounced. This causes undesirable thickness and width variations in the resultant glass ribbon 12, which in turn may lead to process inefficiencies as glass ribbon that is out of specification is discarded. As the bowing progresses with time, use of the forming body must be discontinued and the glass forming apparatus must be rebuilt.

The embodiments of the forming bodies 60 described herein mitigate the on-set of outward bowing in the weirs 67, 68 of the forming body 60 thereby prolonging the service life of the forming body 60 and stabilizing the dimensional characteristics of the glass ribbon 12 formed therefrom.

Figure 3:
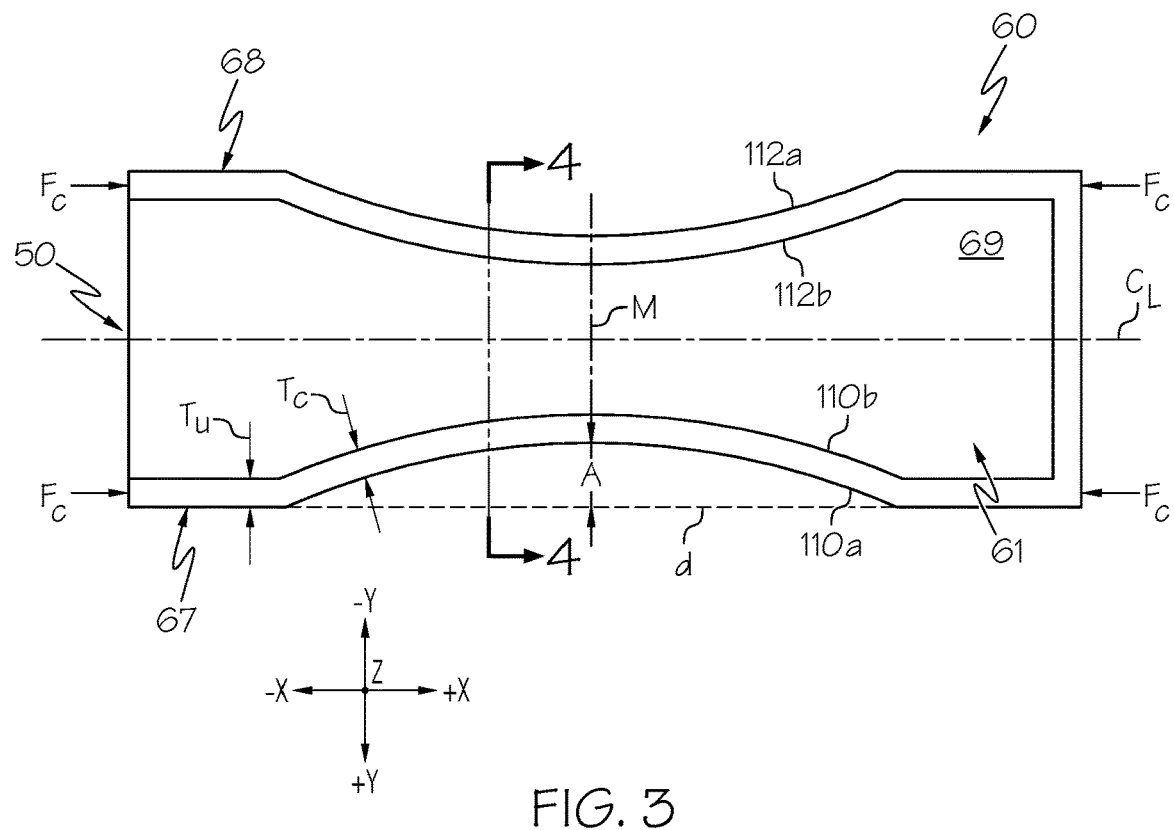
FIG. 3 schematically depicts a top view of the forming body of FIGS. 2A and 2B.

Referring now to FIGS. 2A-2B and 3, in embodiments, the forming bodies 60 described herein may be formed such that at least one of the weirs 67, 68 includes at least a portion that is pre-curved in an inward direction towards a centerline $C_L$ of the trough 61 to counteract the outward bowing of the weirs 67, 68 and extend the service life of the forming body 60. In the embodiments described herein, the centerline $C_L$ of the trough 61 is parallel to the length L (FIG. 1) of the upper portion 65 (FIG. 1) of the forming body 60. For example, FIG. 3 schematically depicts a top view of a cross section of one embodiment of the forming body of FIGS. 2A-2B through the X-Y plane. In this embodiment, both the first weir 67 and the second weir 68 of the trough 61 include a portion that is curved inward towards the centerline $C_L$ of the trough 61. More specifically, a portion of the vertical surface 110 of the first weir 67 is formed with a radius of curvature such that at least a portion of the vertical surface 110a of the first weir 67 curves inward towards the centerline $C_L$ of the trough 61. Similarly, a portion of the vertical surface 112a of the second weir 68 is formed with a radius of curvature such that at least a portion of the vertical surface 112 of the second weir 68 curves inward towards the centerline $C_L$ of the trough 61. It should be noted that, in the drawings appended hereto, the curvatures of the first weir 67 and the second weir 68 are exaggerated for purposes of illustration.

In this embodiment, vertical surface 110a is an outer vertical surface of the first weir 67 and the vertical surface 112a is an outer vertical surface of the second weir 68. The first weir 67 also includes inner vertical surface 110b which, like vertical surface 110a, is formed with a radius of curvature such that at least a portion of the inner vertical surface 110b curves inward towards the centerline $C_L$ of the trough 61. Similarly, the second weir 68 also includes inner vertical surface 112b which, like vertical surface 112a, is formed with a radius of curvature such that at least a portion of the inner vertical surface 112b curves inward towards the centerline $C_L$ of the trough 61. In this embodiment, the curved portions of the first weir 67 and the curved portions of the second weir 68 have a thickness $T_C$ that is substantially equal to the thickness $T_U$ of the un-curved portions of the first weir 67 and the un-curved portions of the second weir 68. However, it should be understood that other embodiments are contemplated and possible, as will be described in further detail herein.

While FIG. 3 depicts portions of the first weir 67 and portions of the second weir 68 as being curved inward towards a centerline $C_L$ of the trough 61, it should be understood that, in alternative embodiments (not depicted), only a portion of one of the weirs 67, 68 (i.e., a portion of the first weir 67 or a portion of the second weir 68) is curved inward towards a centerline $C_L$ of the trough 61.

In some embodiments, the degree of pre-curvature of the weirs 67, 68 may be selected based on the maximum amount (i.e., the maximum radius) of outward bowing that occurs in a forming body of similar dimensions and having weirs that are initially planar. The maximum amount of outward bowing corresponds to the amount of bowing that occurs before the forming body must be withdrawn from service due to the glass flow disturbances caused by the amount of bowing. In embodiments, the weirs 67, 68 may be inwardly pre-curved by an amount that is less than or equal to the maximum amount of outward bowing in a forming body of similar dimensions having weirs that are initially planar but bow outwardly during the course of a glass drawing campaign. The amount of outward bowing may be, for example, calculated from the material characteristics of the forming body, its dimensions, and the operating parameters (i.e., glass flow etc.) of the glass forming apparatus in which it is employed. Alternatively, the amount of outward bowing may be empirically determined from a forming body in service or discontinued from service.

It has been found through empirical studies that the outward bowing of the weirs of a forming body is predominantly linear over time during a glass drawing campaign. As an example, if the forming body 60 is constructed such that the inward pre-curvature of the weirs 67, 68 is equal (and opposite) to the amount of outward bowing of the weirs of a similar forming body having weirs that are initially planar (but bow outwardly over time in service) and which has a maximum service life of P years due to the outward bowing of the weirs, the maximum service life of the forming body 60 constructed such that the weirs have an inward pre-curvature would be approximately 2P. As another example, if the forming body 60 is constructed such that the inward pre-curvature of the weirs 67, 68 is equal to ½ the amount of outward bowing of the weirs of a similar forming body having weirs which are initially planar (but bow outwardly over time in service) and which has a maximum service life of P years due to the outward bowing of the weirs, the maximum service life of the forming body 60 with the weirs having an inward pre-curvature would be approximately 1.5P.

In the embodiments described herein, the curvature imparted to the weirs is represented by the amplitude A of the curvature. The amplitude A of the curvature, as used herein, refers to the degree of deformation of the surface of the weir from planarity. Referring to FIG. 3 by way of example, the vertical surface 110a of the first weir 67 is curved inwards towards the centerline $C_L$ of the trough 61, as described above. The planar position of the first weir 67 is indicated by the dashed line d. The amplitude A of the curvature imparted to the vertical surface 110a of the first weir 67 is the maximum distance between the dashed line d and the curved vertical surface 110a in a direction orthogonal to the dashed line d.

Figure 4:
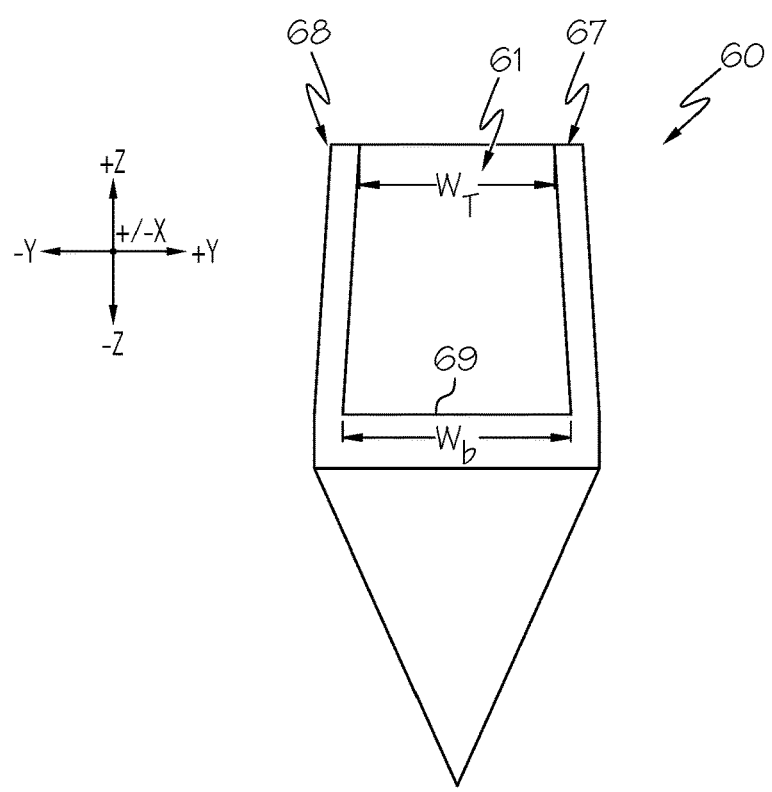
FIG. 4 schematically depicts a cross section of a forming body in which the width of the trough is greater at a base of the trough than at the top of the weirs, according to one or more embodiments shown and described herein.

In embodiments, the curvature of the first weir 67 and/or the second weir 68 extends from a top of the trough 61 to the base 69 of the trough 61. In these embodiments, the width of the trough 61 is substantially uniform from the top of the trough 61 to the base 69 of the trough 61 through any given cross section along the length L, as depicted in FIG. 2B. However, in other embodiments, the curvature of the first weir 67 and/or the second weir 68 may be graduated such that a width of the trough 61 at the top of the trough 61 is greater than a width of the trough 61 at the base 69 of the trough 61. For example, FIG. 4 schematically depicts a cross section of one embodiment of a forming body 60 in which the curved portions of the first weir 67 and the second weir 68 curve inwardly and the curvature of the first weir 67 and the second weir 68 are smoothly graduated from the top of the trough 61 to the base 69 of the trough 61. In this embodiment, the width $W_b$ of the trough 61 at the base of the trough 61 is greater than the width $W_t$ of the trough 61 at the top of the trough 61. Constructing the forming body 60 with this configuration may minimize the impact on glass flow through the trough 61 while also mitigating the onset of the outward bowing of the weirs 67, 68.

Figure 5A:
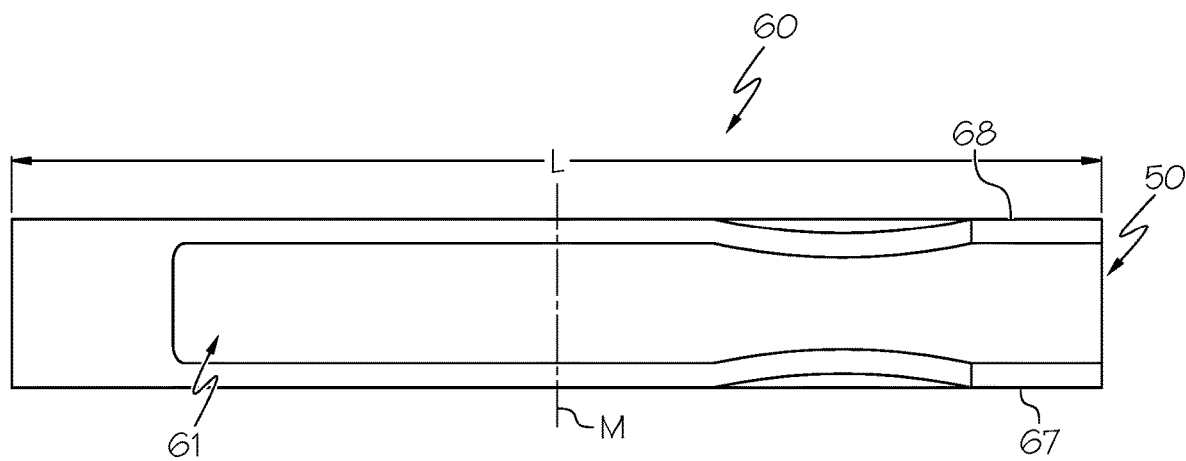
FIG. 5A schematically depicts a top view of a forming body in which the portions of the weirs having an inward curvature are positioned between an inlet end of the forming body and a midpoint of the length of the forming body, according to one or more embodiments shown and described herein.
Figure 5B:
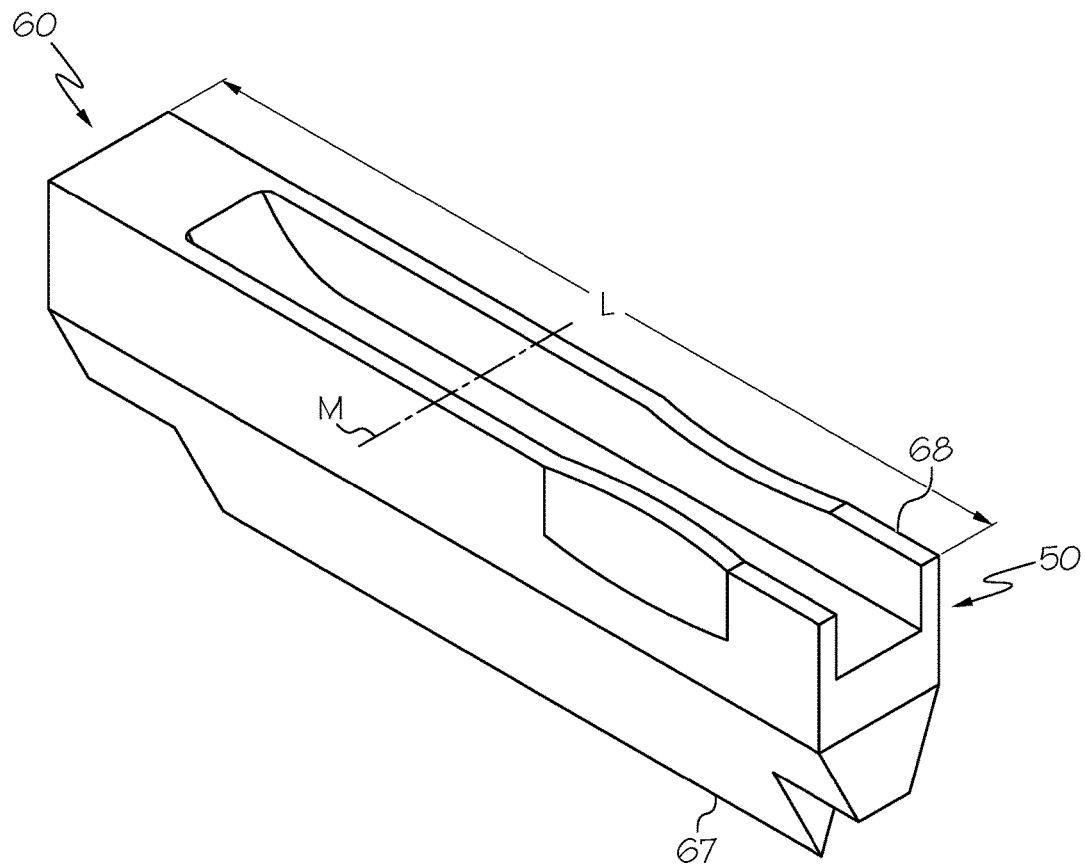
FIG. 5B schematically depicts an isometric view of the forming body of FIG. 5A.

While FIG. 3 depicts the inward curvature of first weir 67 and the second weir 68 as being centered on the midpoint M of the length L (FIG. 1) of the forming body 60, it should be understood that other configurations are contemplated and possible. For example, as described above, it has been determined that the outward bowing of the weirs 67, 68 of the forming body generally occurs in the first ⅓ of the length L of the forming body 60 from the inlet end 50. Accordingly, in some embodiments, the forming body 60 is constructed such that the portions of the weirs 67, 68 having the inward curvature are located between the inlet end 50 of the forming body 60 and the midpoint M of the length L of the forming body 60, as depicted in FIGS. 5A and 5B. In embodiments, the forming body 60 is constructed such that the portions of the weirs 67, 68 comprising the inward curvature are located between the inlet end 50 of the forming body 60 and ⅓ of the length L of the forming body 60 from the inlet end 50.

Referring again to FIG. 3, in some embodiments, a compressive force F may be applied to the inlet end faces of the weirs 67, 68 such that the weirs 67, 68 are compressed in a length (longitudinal) direction of the forming body. The application of the compressive force F to the inlet end faces, in conjunction with the inward curvature of the one or more vertical surfaces 110a, 110b, 112a, 112b of the weirs 67, 68, creates bending moments along the weirs 67, 68. The compressive force may be applied such that the bending moment imparted to each weir is towards the centerline $C_L$ of the forming body. As a result, the bending moment counters the outward bowing of the weirs 67, 68 due to creep and the pressures exerted on the inner vertical surfaces 110b, 112b of the weirs 67, 68 due to the molten glass in the trough 61. In embodiments, the compressive force F may be applied to the inlet end faces of the weirs 67, 68 using hydraulic rams and/or mechanical rams (e.g., jack screws, pressure bolts or the like). In embodiments, the compressive force F is applied proximate the top of the weir (i.e., in the +Z-direction of the coordinate axes) as the weirs 67, 68 are more prone to deformation near the top. However, it should be understood that the compressive force F may be applied at other locations along the face of the weir in order to impart the desired bending moment and counteract the outward bowing of the weirs.

Figure 6:
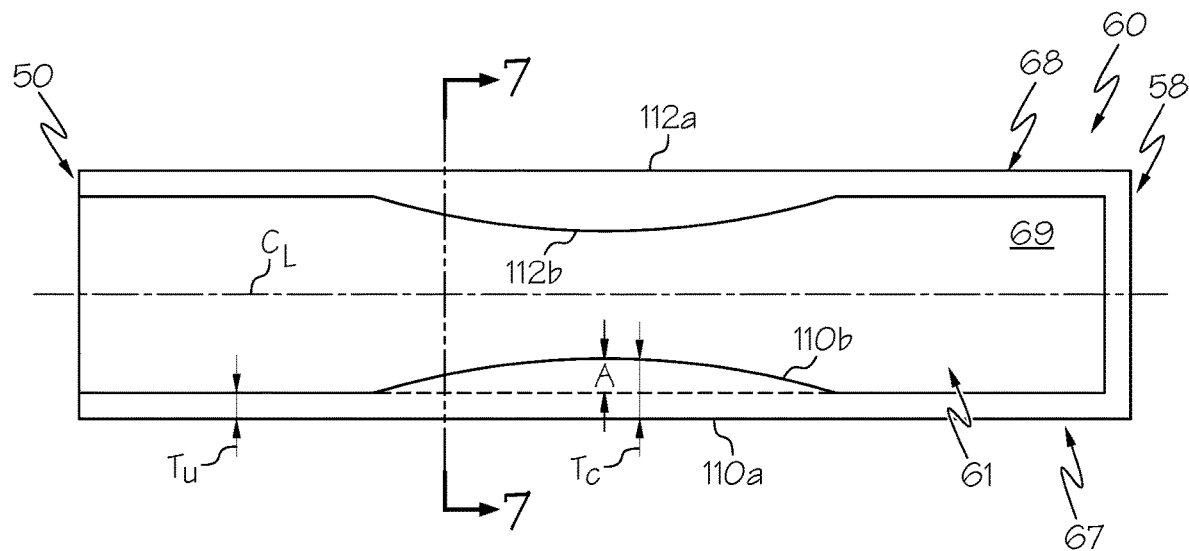
FIG. 6 schematically depicts a top view of a forming body in which portions of the inner vertical surfaces of the weirs are inwardly curved and the outer vertical surfaces are substantially planar, according to one or more embodiments shown and described herein.

Referring now to FIG. 6, an alternative embodiment of a forming body 60 is schematically depicted in which the forming body 60 includes weirs 67, 68 having a portion inwardly curved towards a centerline $C_L$ of the trough 61. In this embodiment, the forming body 60 is constructed such that a portion of the inner vertical surface 110b of the first weir 67 is inwardly curved towards the centerline $C_L$ of the trough 61. Similarly, a portion of the inner vertical surface 112b of the second weir 68 is inwardly curved towards the centerline $C_L$ of the trough 61. However, in this embodiment, the outer vertical surface 110a of the first weir 67 and the outer vertical surface 112a of the second weir 68 do not include inwardly curved portions but, instead, are substantially planar between the inlet end 50 and the compression (second) end 58 of the forming body 60. In this embodiment, the thicknesses $T_C$ of the portions of the weirs 67, 68 that include the inwardly curved portions are greater than thicknesses $T_U$ of the portions of the weirs 67, 68 in which both the outer vertical surfaces 110a, 112a and the inner vertical surfaces 110b, 112b are substantially planar. Constructing the forming body 60 such that portions of the inner vertical surfaces 110b, 112b are inwardly curved towards the centerline $C_L$ of the trough 61 assists in mitigating the onset of the outward bowing of the weirs 67, 68 and, hence, increases the service life of the forming body 60.

Figure 7:
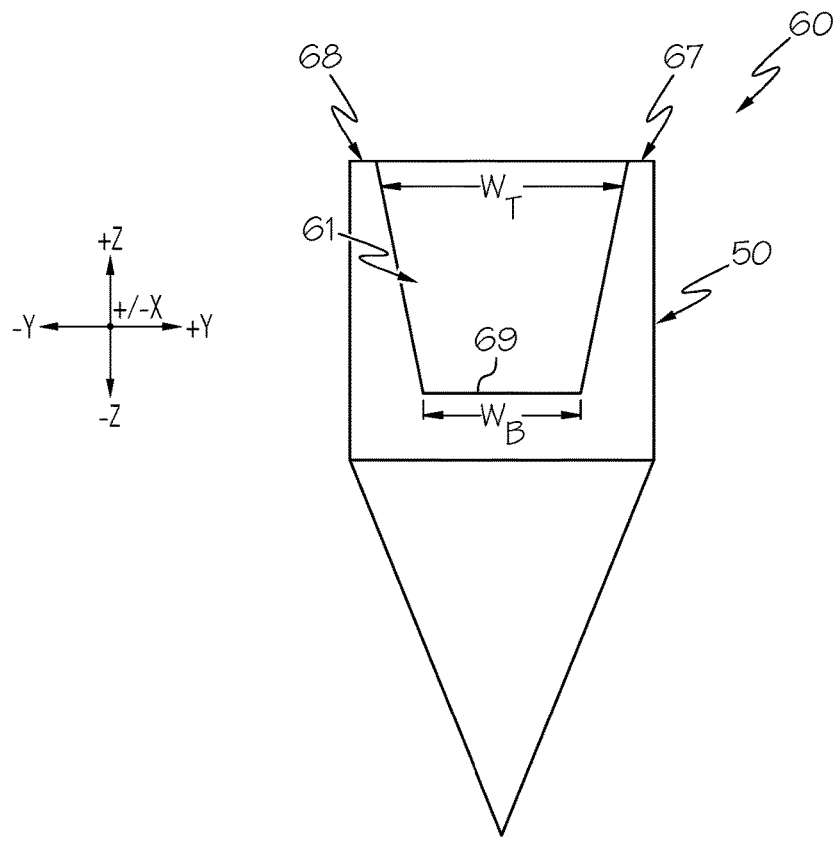
FIG. 7 schematically depicts a cross section of the forming body of FIG. 6.

FIG. 7 schematically depicts a cross section of one embodiment of a forming body 60 in which the curved portions of the first weir 67 and the second weir 68 curve inwardly and the curvature of the first weir 67 and the second weir 68 are graduated from the base of the trough 61 to the top of the trough 61. In this embodiment, the width $W_b$ of the trough 61 at the base of the trough 61 is less than the width $W_t$ of the trough 61 at the top of the trough 61.

While the embodiment of the forming body depicted in FIG. 6 only includes a single vertical surface of each weir that is inwardly curved toward the centerline of the trough, it should be understood that the weirs of these embodiments may contain similar features as those described hereinabove with respect to the embodiment of the forming body depicted in FIG. 3. For example, the embodiment of the forming body depicted in FIG. 6 may be constructed such that a width of the trough between the inwardly curved portions of the weirs 67, 68 is greater at the base 69 of the trough 61 than at the top of the weirs 67, 68, as depicted in FIG. 4. In addition, the forming body 60 in FIG. 6 may be constructed such that the portions of the weirs 67, 68 having the inward curvature are located between the inlet end 50 of the forming body 60 and the midpoint M of the length L of the forming body 60, as depicted in FIGS. 5A and 5B. In embodiments, the forming body 60 depicted in FIG. 6 may be constructed such that the portions of the weirs 67, 68 having the inward curvature are located between the inlet end 50 of the forming body 60 and ⅓ of the length L of the forming body 60.

While FIGS. 3-7 depict embodiments of forming bodies in which portions of the vertical surfaces of the weirs are inwardly curved to mitigate the onset of outward bowing of the weirs, other configurations of the forming bodies may be employed to mitigate the outward bowing of the weirs 67, 68.

Figure 8A:
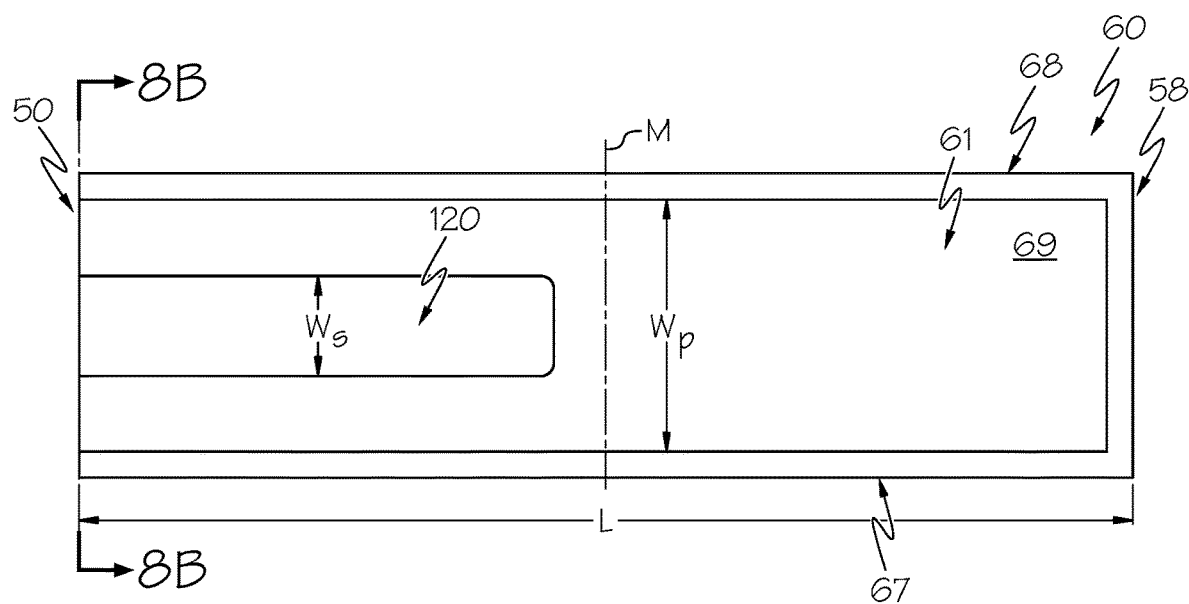
FIG. 8A schematically depicts a top view of a forming body which includes a secondary trough formed in the base of the primary trough of the forming body, according to one or more embodiments shown and described herein.
Figure 8B:
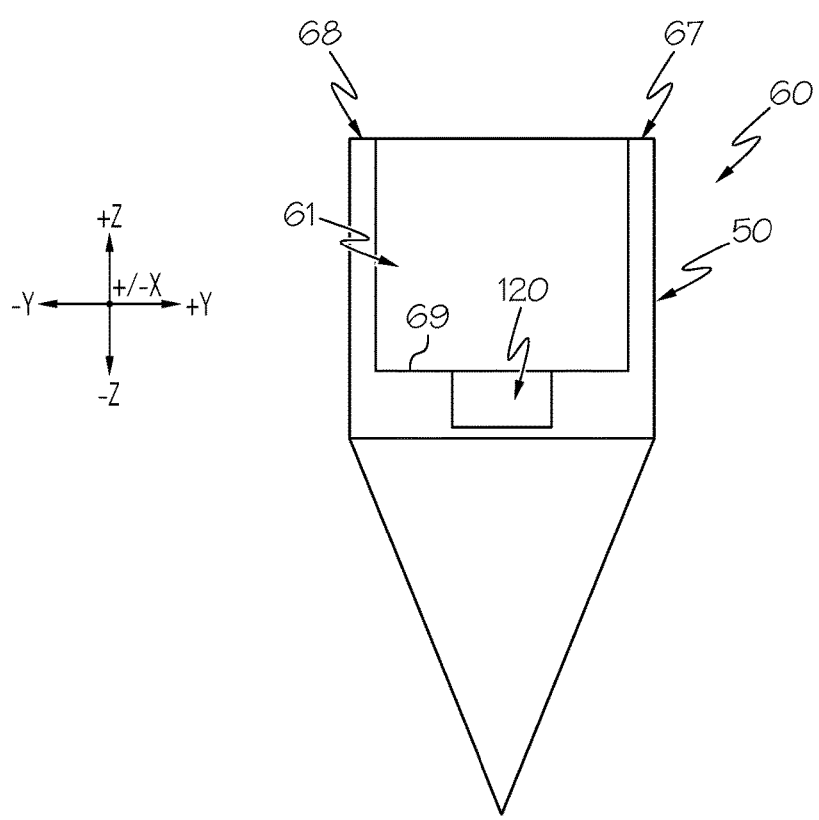
FIG. 8B schematically depicts a cross section of the forming body of FIG. 8A.

For example, FIGS. 8A and 8B schematically depict an embodiment of a forming body 60 that includes a second trough 120 formed within the trough 61. In this embodiment, the trough 61 is a first, or primary trough and the second, or secondary trough 120 is formed in the base 69 of the primary trough 61. In embodiments, the width $W_s$ of the second trough 120 is less than the width $W_P$ of the first trough 61.

In this embodiment, the second trough 120 may be included in the forming body 60 to mitigate the onset of outward bowing of the weirs 67, 68. Specifically, the reduced width $W_S$ of the second trough 120 (and hence the increased wall thickness of the second trough) makes the second trough 120 less susceptible to outward bowing due to the applied pressure of the molten glass than the first trough 61. Further, the additional volume of the second trough 120 permits constructing the first trough 61 with weirs 67, 68 having a decreased height (i.e., the dimension of the weirs between the top of the weirs and the bottom of the first trough 61 in the +/−Z direction of the coordinate axes depicted) while still maintaining the overall glass handling capacity of the first trough 61. Decreasing the height of the weirs 67, 68 makes the weirs 67, 68 less susceptible to outward bowing upon exposure to the pressure of the molten glass at elevated temperatures over extended periods of time.

In some embodiments, the second trough 120 may extend from the inlet end 50 and across the entire length L of the upper portion 65 (FIG. 1) of the forming body 60. In some embodiments, the second trough 120 may extend from the inlet end 50 to a distance that is less than the entire length L of the upper portion 65 (FIG. 1) of the forming body 60, as depicted in FIG. 8B. More specifically, it has been determined that the outward curvature of the weirs 67, 68 of the forming body generally occurs in the first ⅓ of the length L of the forming body 60 from the inlet end 50, as noted hereinabove. Accordingly, in some embodiments, the forming body 60 is constructed such that the second trough 120 extends from the inlet end 150 toward the compression end 58 to a point that is less than or equal to a midpoint M of the length L of the forming body. In some embodiments, the forming body 60 is constructed such that the second trough 120 extends from the inlet end 150 toward the compression end 58 to a point that is less than or equal to ⅓ of the length L of the forming body. Constructing the forming body in this manner reduces the pressure asserted by the molten glass against the weirs 67, 68 in the area of the weirs 67, 68 most susceptible to bowing and, as a result, increases the service life of the forming body 60.

Figure 9B:
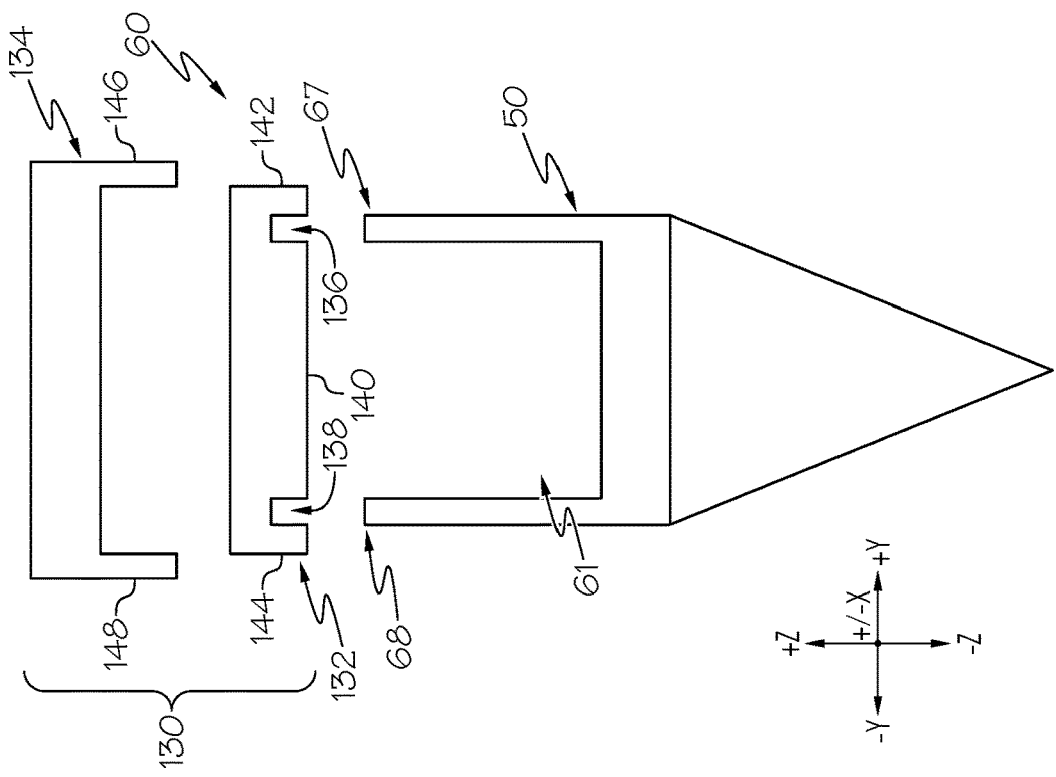
FIG. 9B schematically depicts an exploded view of the forming body and yolk block assembly of FIG. 9A.
Figure 9A:
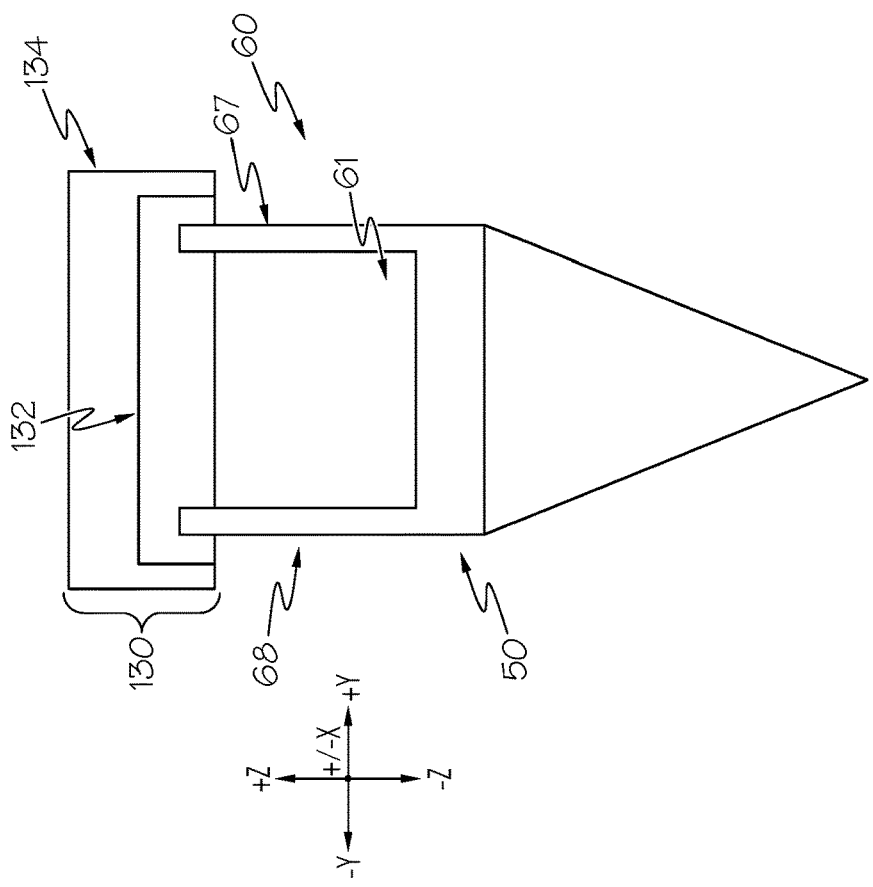
FIG. 9A schematically depicts a cross section of a forming body which includes a yolk block assembly coupled to the first weir and the second weir.

Referring now to FIGS. 9A and 9B, in another embodiment, the forming body 60 may include a yoke block assembly 130 to mitigate the onset of outward bowing of the weirs 67, 68. The yoke block assembly 130 includes a yoke block 132 and, optionally, a restraining block 134. The yoke block 132 may be formed from the same material as the forming body 60 (e.g., zircon, silicon carbide, xenotime, and/or alumina based refractory ceramics) and generally includes a pair of weir channels (slots) 136, 138 formed between outer flanges 142, 144 and an optional boss (land) 140. The weir channels 136, 138 are sized to receive the weirs 67, 68 of the forming body 60. The outer flanges 142, 144 prevent the outward movement of the weirs 67, 68 due to the pressure exerted by the molten glass against the weirs 67, 68 while the boss 140 (when included) prevents the inward movement of the weirs 67, 68.

The restraining block 134 may be formed from silicon carbide or a material with similar creep characteristics. The restraining block 134 may include outer flanges 146, 148 defining a slot to facilitate securing the restraining block 134 to the yoke block 132. The restraining block 134, when included, reinforces the yoke block 132 and prevents movement of the yoke block 132 due to creep.

While FIGS. 9A and 9B depict the yoke block assembly 130 as comprising a restraining block 134, it should be understood that, in other embodiments, the yoke block assembly 130 may be constructed without the restraining block 134.

In the embodiments described herein, the yoke block assembly 130 is positioned on the forming body so as not to disrupt the flow of molten glass out of the trough 61 and over the weirs 67, 68 of the forming body 60. For example, in some embodiments, the yoke block assembly 130 is positioned on the forming body 60 proximate the inlet end 50 of the forming body 60 where the trough 61 is deepest.

Figure 10A:
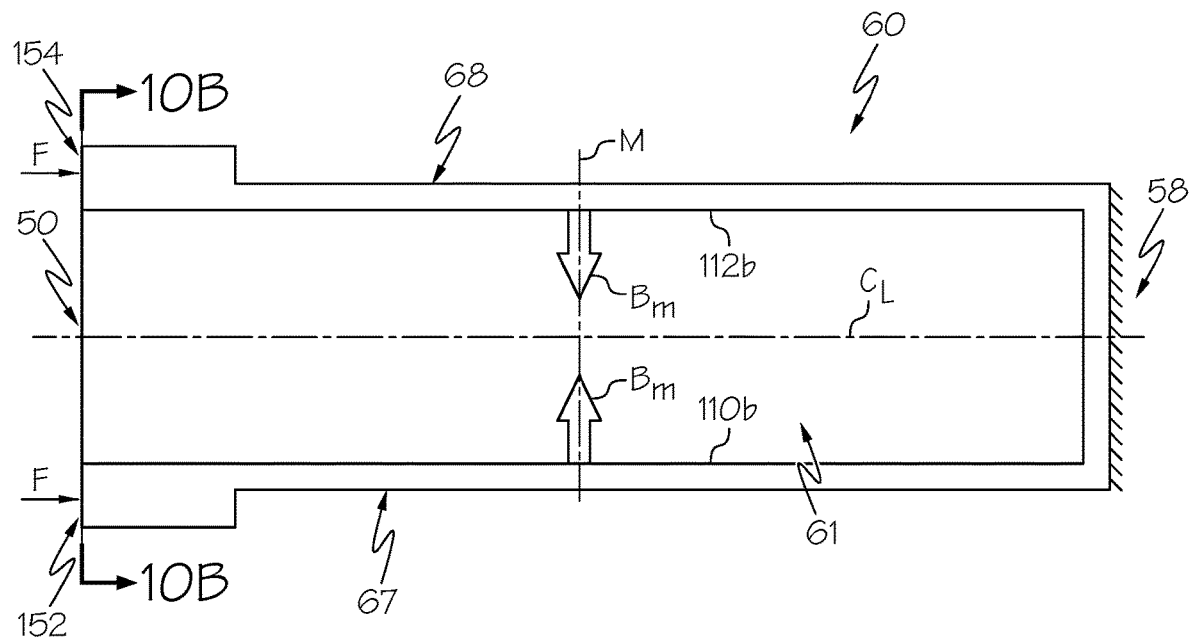
FIG. 10A schematically depicts a top view of a forming body in which a thickness of the weirs of the forming body is increased proximate the ends of the forming body.
Figure 10B:
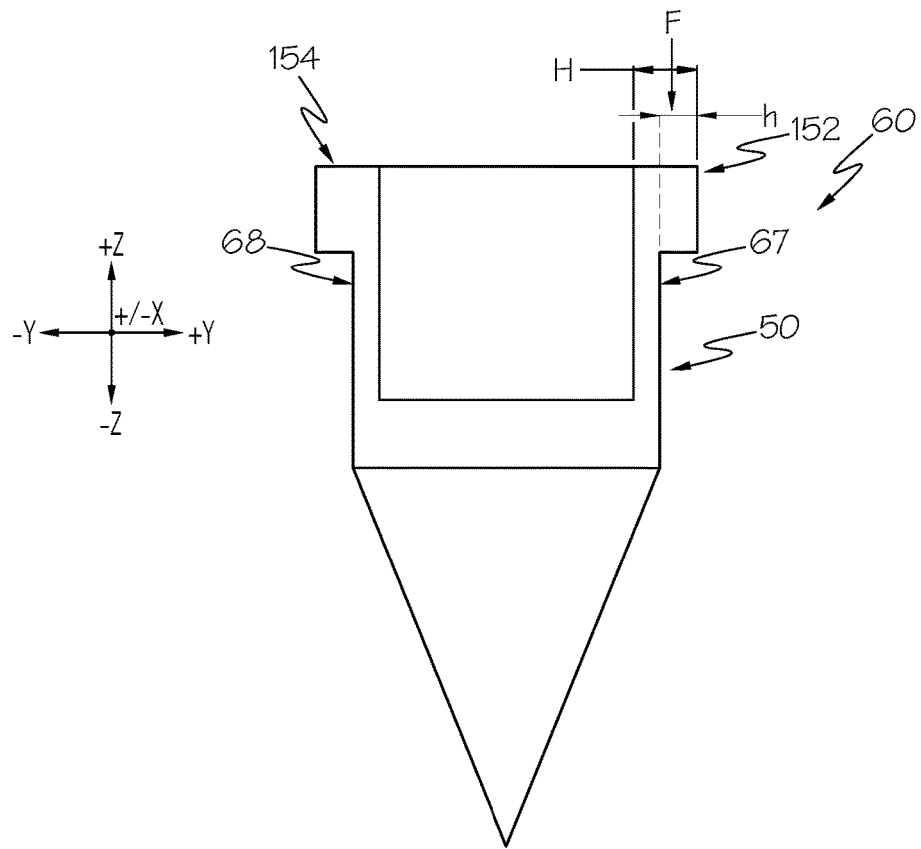
FIG. 10B schematically depicts a cross sectional view of the forming body of FIG. 10A.

Referring now to FIGS. 10A and 10B, in another embodiment, the forming body is constructed such that the inlet end faces of the weirs 67, 68 extend outwardly in a direction away from the trough 61 (i.e., in the +/−y direction of the coordinate axes depicted in FIG. 10B). In these embodiments, the inlet end faces of the weirs 67, 68 may have a greater thickness than the average thickness of the weirs over the length L of the forming body 60. Specifically, the inlet end face 152 of the first weir 67 is formed such that the thickness H of the inlet end face 152 of the first weir 67 extends outwardly away from the trough 61. In these embodiments, the thickness of the inlet end face 152 may be greater than the average thickness of the first weir 67 over the length of the forming body. Similarly, the inlet end face 154 of the second weir 68 is formed such that the thickness H of the inlet end face 154 of the second weir 68 extends outwardly, away from the trough 61. In these embodiments, the thickness of the inlet end face 154 may be greater than the average thickness of the second weir 68 over the length of the forming body. While FIG. 10A depicts a "step" transition from the weir to the thickness H of the inlet end faces 152, 154, it should be understood that other embodiments are contemplated and possible, such as when the weirs gradually transition to the thickness H at the inlet faces 152, 154 over a length in the +X direction. This transition may be linear, parabolic (as depicted FIG. 10C), or the like.

Increasing the thickness of the inlet end face 152 of the first weir 67 and the thickness of the inlet end face 154 of the second weir 68 allows for a compressive force F to be applied at a distance h offset from the outer vertical surface of the weirs 67, 68 in a longitudinal direction (i.e., +/−y of the coordinate axes shown) away from the centerline $C_L$ of the trough 61. In embodiments, the compressive force F may be applied to the inlet end face 152 of the first weir 67 and to the inlet end face 154 of the second weir 68 using hydraulic rams and/or mechanical rams (e.g., jack screws, pressure bolts or the like). With the compression end 58 of the forming body fixed in position, these off-axis compressive forces F compress the weirs 67, 68 of the forming body 60 in the length direction and cause a bending moment $B_M$ in each of the weirs 67, 68 in a direction towards the centerline $C_L$ of the trough 61. The bending moments counteract the outward bowing of the weirs 67, 68 due to creep and the pressure of the molten glass against the inner vertical surfaces 110b, 112b of the weirs 67, 68. It should be understood that the increased thickness of the inlet end face 152 of the first weir 67 and the increased thickness of the inlet end face 154 of the second weir 68 may be used with either pre-curved weirs (e.g., weirs as depicted in FIGS. 3, 6, and 7) or weirs in which both the inner and outer vertical surfaces are substantially planar (e.g., as depicted in FIG. 10A). In embodiments where the inner and outer vertical surfaces of the weirs 67, 68 are substantially planar, the increased thickness of the inlet end face 152 of the first weir 67 and the inlet end face 154 of the second weir 68 allow for significant bending moments to be created in the weirs 67, 68 despite the inner and outer vertical surfaces of the weirs 67, 68 being substantially planar.

Figure 10C:
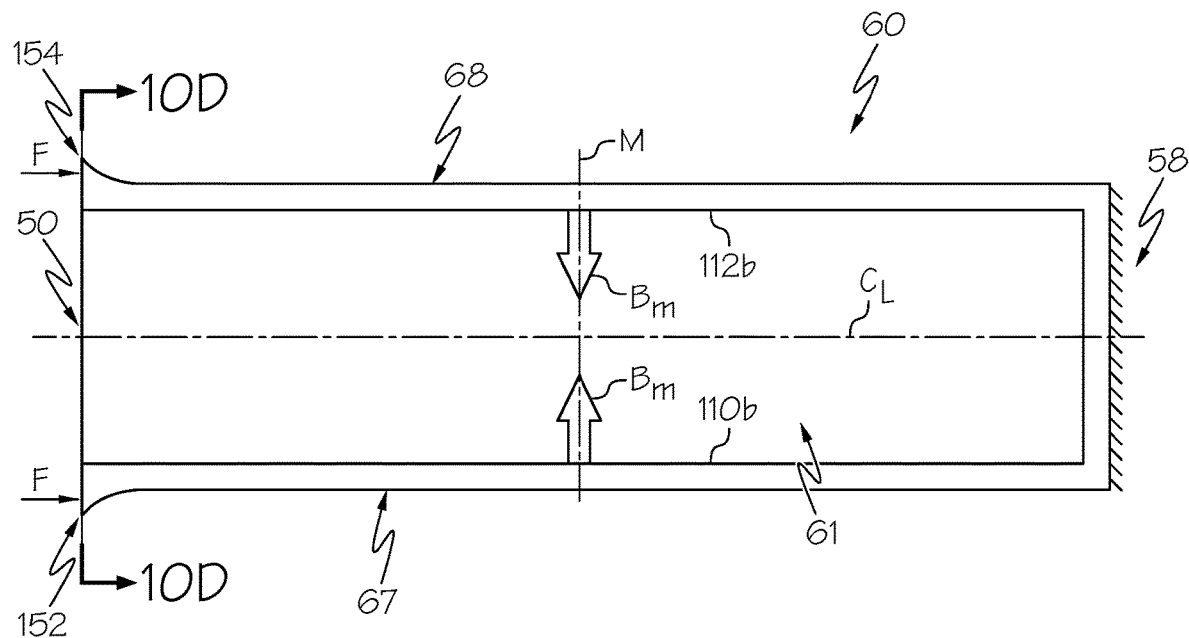
FIG. 10C schematically depicts a top view of a forming body in which a thickness of the weirs of the forming body is increased proximate the ends of the forming body.
Figure 10D:
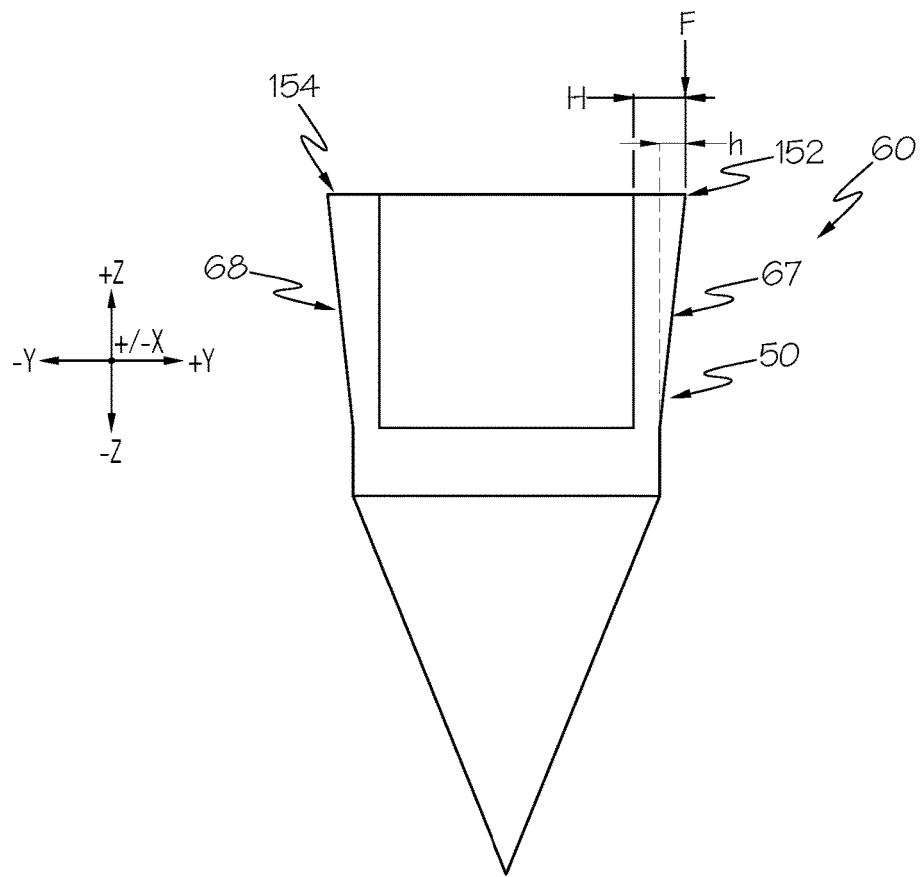
FIG. 10D schematically depicts a cross sectional view of the forming body of FIG. 10C.

While FIGS. 10A and 10B depict one embodiment of a forming body 60 having weirs with increased thickness at their inlet end faces, it should be understood that other embodiments are contemplated and possible. For example, FIGS. 10C and 10D depict an alternative embodiment of a forming body 60 having inlet end faces with increased thicknesses. In this embodiment, the thickness of the inlet end face 152 of the first weir 67 and the thickness of the inlet end face 154 of the second weir 68 decrease parabolically or even exponentially in a direction toward the midpoint M of the length L of the forming body 60, as depicted in FIG. 10C. However, it should be understood that other embodiments are contemplated and possible. For example, in an alternative embodiment (not shown) the thickness of the inlet end face 152 of the first weir 67 and the thickness of the inlet end face 154 of the second weir 68 decrease linearly in a direction toward the midpoint M of the length L of the forming body 60.

In embodiments, the thickness of the inlet end face 152 of the first weir 67 and the thickness of the inlet end face 154 of the second weir 68 decrease linearly in the downward vertical direction (i.e., the −Z direction of the coordinate axes depicted in the figure) as depicted in FIG. 10D. However, it should be understood that other embodiments are contemplated and possible. For example, in an alternative embodiment (not shown) the thickness of the inlet end face 152 of the first weir 67 and the thickness of the inlet end face 154 of the second weir 68 decrease parabolically or even exponentially in the downward vertical direction.

While embodiments of forming bodies with weirs having a portion which is curved inward towards a centerline of the trough have been described, it should be understood that other configurations of weirs may be used to counteract the outward bowing of the weirs of the forming body due to creep.

Figure 11:
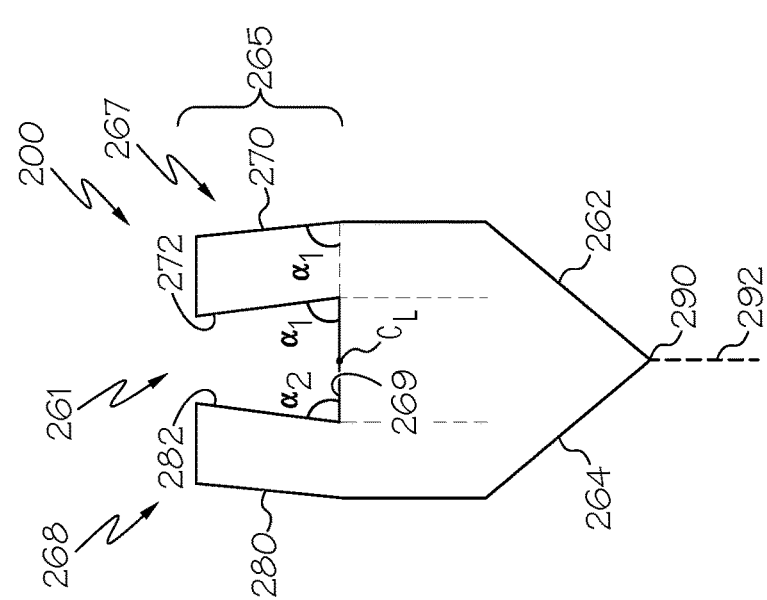
FIG. 11 schematically depicts a cross sectional view of a forming body according to one or more embodiments shown and described herein.
Figure 11:
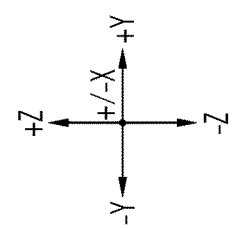

Referring now to FIG. 11, one embodiment of a forming body 200 is schematically depicted in cross section. In this embodiment, the forming body 200 generally includes a trough 261, a first forming surface 262, and a second forming surface 264 as described hereinabove with respect to FIGS. 2A and 2B. The trough 261 is located in the upper portion 265 of the forming body 200 and comprises a first weir 267, a second weir 268, and a base 269. The trough 261 may vary in depth as a function of the length of the forming body 200. The first forming surface 262 and the second forming surface 264 extend from the upper portion 265 of the forming body 200 in a vertically downward direction (i.e., the −Z direction of the coordinate axes depicted in the figures) and converge towards one another, joining at a root 290. The root 290 forms the lower edge of the forming body 200. Accordingly, it should be understood that the first forming surface 262 and the second forming surface 264 form an inverted isosceles or equilateral triangle extending from the upper portion 265 of the forming body 200 with the root 290 forming the lower-most vertex of the triangle in the downstream direction. A draw plane 292 generally bisects the root 290 in the +/−Y directions of the coordinate axes depicted in the figures and extends in the vertically downward direction.

In the embodiment depicted in FIG. 11, the forming body 200 is formed such that at least one of the weirs 267, 268 includes at least a portion that is angled inward, towards a centerline $C_L$ of the trough 261, to counteract the outward bowing of the weirs 267, 268 and extend the service life of the forming body 200. In the embodiments described herein, the centerline $C_L$ of the trough 261 is parallel to the length L (FIG. 1) of the upper portion 265 of the forming body 200. In the embodiment of the forming body 200 depicted in FIG. 11, both the first weir 267 and the second weir 268 of the trough 261 include a portion that is angled inward towards the centerline $C_L$ of the trough 61. More specifically, the forming body 200 is constructed such that an angle $\alpha_1$ between at least a portion of an interior surface 272 of the first weir 267 and the base 269 of the trough 261 is less than 90°. That is, at least a portion of the interior surface 272 of the first weir 267 is angled inwards, towards the centerline $C_L$ of the trough 261. Similarly, an angle $\alpha_2$ between at least a portion of an interior surface 282 of the second weir 268 and the base 269 of the trough 261 is less than 90°. That is, at least a portion of the interior surface 282 of the second weir 268 is angled inwards, towards the centerline $C_L$ of the trough 261. It should be noted that, in the drawings appended hereto, the angles of the first weir 267 and the second weir 268 are exaggerated for purposes of illustration.

In the embodiment of the forming body 200 depicted in FIG. 11, the forming body 200 is constructed such that the exterior surface 270 of the first weir 267 is substantially parallel with the interior surface 272 of the first weir. That is, the forming body 200 is constructed such that the angle between the exterior surface 270 of the first weir 267 and the base 269 is the same as the angle $\alpha_1$ between the interior surface 272 of the first weir 267 and the base 269 of the trough 261. Similarly, the exterior surface 280 of the second weir 268 is substantially parallel with the interior surface 282 of the second weir 268. That is, the forming body 200 is constructed such that the angle between the exterior surface 280 of the second weir 268 and the base 269 is the same as the angle $\alpha_2$ between the interior surface 282 of the second weir 268 and the base 269 of the trough 261. Accordingly, it should be understood that, in this embodiment, a thickness of the first weir 267 and a thickness of the second weir 268, as measured along a line perpendicular to the respective interior and exterior surfaces and extending between the respective interior and exterior surfaces, are substantially constant from the base 269 of the trough 261 to the top of each weir 267, 268.

In some embodiments, the angle of the interior surfaces of the weirs 267, 268 relative to the base 269 of the trough 261 may be selected based on the maximum amount of outward bowing that occurs in a forming body of similar dimensions and similar materials, operating under similar conditions and having weirs that are initially planar. The maximum amount of outward bowing corresponds to the amount of bowing that occurs before the forming body must be withdrawn from service due to the glass flow disturbances caused by the amount of bowing.

In embodiments, the weirs 267, 268 may be inwardly angled by an amount that is less than or equal to the smallest angle of the weirs relative to the base when the maximum amount of outward bowing is present in a forming body of similar dimensions and having weirs that are initially planar but bowed outwardly during the course of a glass drawing campaign. The angle of the outwardly bowed weirs may be, for example, calculated from the material characteristics of the forming body, its dimensions, and the operating parameters (i.e., glass flow etc.) of the glass forming apparatus in which it is employed. Alternatively, the angle of the outwardly bowed weirs may be empirically determined from a forming body in service or discontinued from service.

As noted hereinabove, it has been found through empirical studies that the outward bowing of the weirs of a forming body is predominantly linear over time during a glass drawing campaign. As an example, if the forming body 200 is constructed such that the weirs 267, 268 are initially inwardly angled, as depicted in FIG. 11, by an amount that is equal (and opposite) to the angle of weirs of a similar forming body having weirs that are initially planar but bowed outwardly to a maximum amount over a maximum service life of P years, the maximum service life of a forming body 200 constructed such that the weirs are initially inwardly angled by the maximum amount would be approximately 2P. As another example, if the forming body 200 is constructed such that the weirs 267, 268 are initially inwardly angled by an amount that is ½ the angle of weirs of a similar forming body having weirs that are initially planar but bowed outwardly to a maximum amount over a maximum service life of P years, the maximum service life of the forming body 200 constructed such that the weirs are inwardly angled by ½ the maximum amount would be approximately 1.5P.

Figure 12:
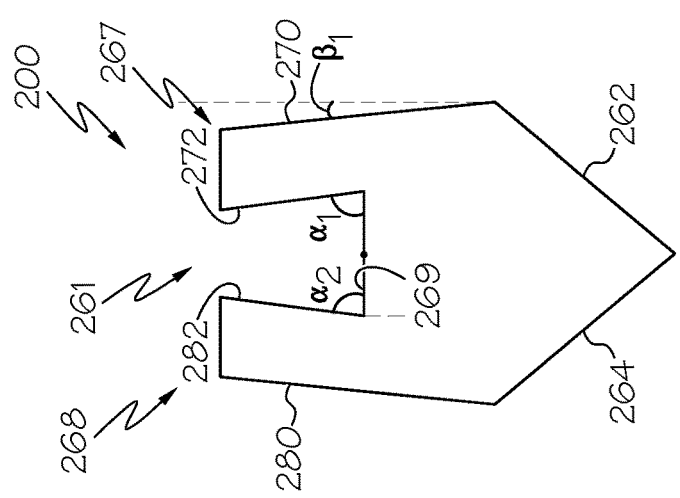
FIG. 12. schematically depicts a cross sectional view of a forming body according to one or more embodiments shown and described herein.
Figure 12:
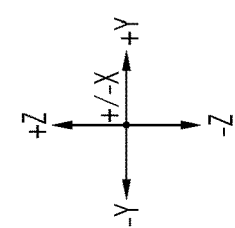

Referring now to FIG. 12, another embodiment of a forming body 200 is schematically depicted in cross section. In this embodiment the forming body 200 is constructed such that an angle $\alpha_1$ between at least a portion of an interior surface 272 of the first weir 267 and the base 269 of the trough 261 is less than 90° and an angle $\alpha_2$ between at least a portion of an interior surface 282 of the second weir 268 and the base 269 of the trough 261 is less than 90°, as described above with respect to FIG. 11. In this embodiment, the exterior surface 270 of the first weir 267 extends to the first forming surface 262 and the entire length of the exterior surface 270 of the first weir 267 is inclined towards the trough 261 of the forming body 200 with respect to vertical (i.e., with respect to an axis parallel to the Z-axis of the coordinate axes depicted in FIG. 12) by an angle $\beta_1$. Similarly, the exterior surface 280 of the second weir 268 extends to the second forming surface 264 and the entire length of the exterior surface 270 of the first weir 267 is inclined towards the trough 261 of the forming body 200 with respect to vertical (i.e., with respect to an axis parallel to the Z-axis of the coordinate axes depicted in FIG. 12) by an angle $\beta_2$ (not shown). As with the embodiment of the forming body depicted in FIG. 11, the inward angle of the interior surfaces 272, 282 of the weirs 267, 268 counteracts the outward bowing of the weirs due to creep and extends the service life of the forming body 200. In embodiments, a thickness of the first weir 267 and a thickness of the second weir 268, as measured along a line perpendicular to the respective interior and exterior surfaces and extending between the respective interior and exterior surfaces, are substantially constant from the base 269 of the trough 261 to the top of each weir 267, 268. In some other embodiments, a thickness of the first weir 267 and a thickness of the second weir 268, as measured along a line perpendicular to at least one of the interior surface and the exterior surface and extending between the respective interior and exterior surfaces, is non-constant from the base 269 of the trough 261 to the top of each weir 267, 268. For example, in embodiments, the thickness of the weir may be less at the base 269 of the trough 261 than at the top of each weir 267, 268. Alternatively, the thickness of the weir may be greater at the base 269 of the trough 261 than at the top of each weir 267, 268.

Figure 13:
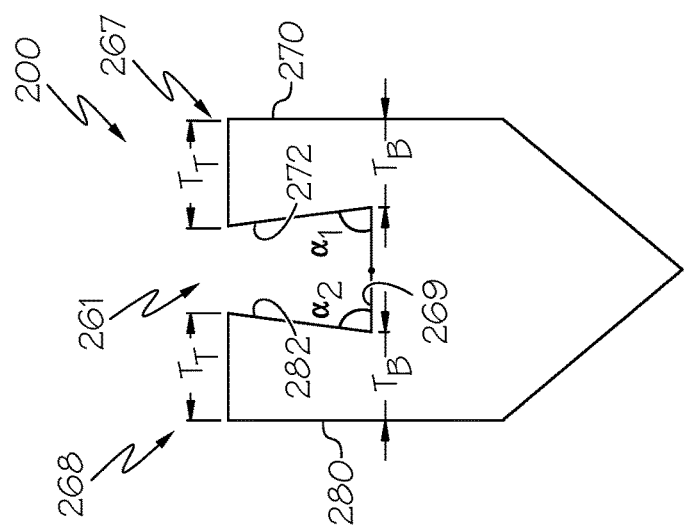
FIG. 13 schematically depicts a cross sectional view of a forming body according to one or more embodiments shown and described herein.
Figure 13:
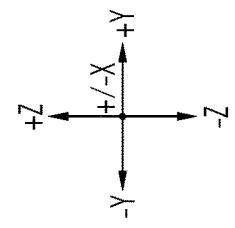

Referring now to FIG. 13, another embodiment of a forming body 200 is schematically depicted in cross section. In this embodiment the forming body 200 is constructed such that an angle $\alpha_1$ between at least a portion of an interior surface 272 of the first weir 267 and the base 269 of the trough 261 is less than 90° and an angle $\alpha_2$ between at least a portion of an interior surface 282 of the second weir 268 and the base 269 of the trough 261 is less than 90°, as described above with respect to FIGS. 11 and 12. However, in this embodiment, at least a portion of an exterior surface 270 of the first weir 267 is non-parallel with the interior surface 272 of the first weir 267. Similarly, at least a portion of an exterior surface 280 of the second weir 268 is non-parallel with the interior surface 282 of the second weir 268. In the embodiment depicted in FIG. 13, the exterior surfaces 270, 280 of the first weir 267 and the second weir 268 are substantially parallel to vertical (i.e., to an axis parallel to the Z-axis of the coordinate axes depicted in FIG. 13). Accordingly, due to the inwardly angled orientation of the interior surfaces 272, 282 of the first weir 267 and the second weir 268, the thickness $T_T$ of the first weir 267 and the second weir 268 at the top of the first weir 267 and at the top of the second weir 267 is greater than a thickness $T_B$ of the first weir 267 and the second weir 268 at the base 269 of the trough 261. As with the embodiment of the forming body depicted in FIGS. 11 and 12, the inward angle of the interior surfaces 272, 282 of the weirs 267, 268 counteracts the outward bowing of the weirs due to creep and extends the service life of the forming body 200.

Figure 14:
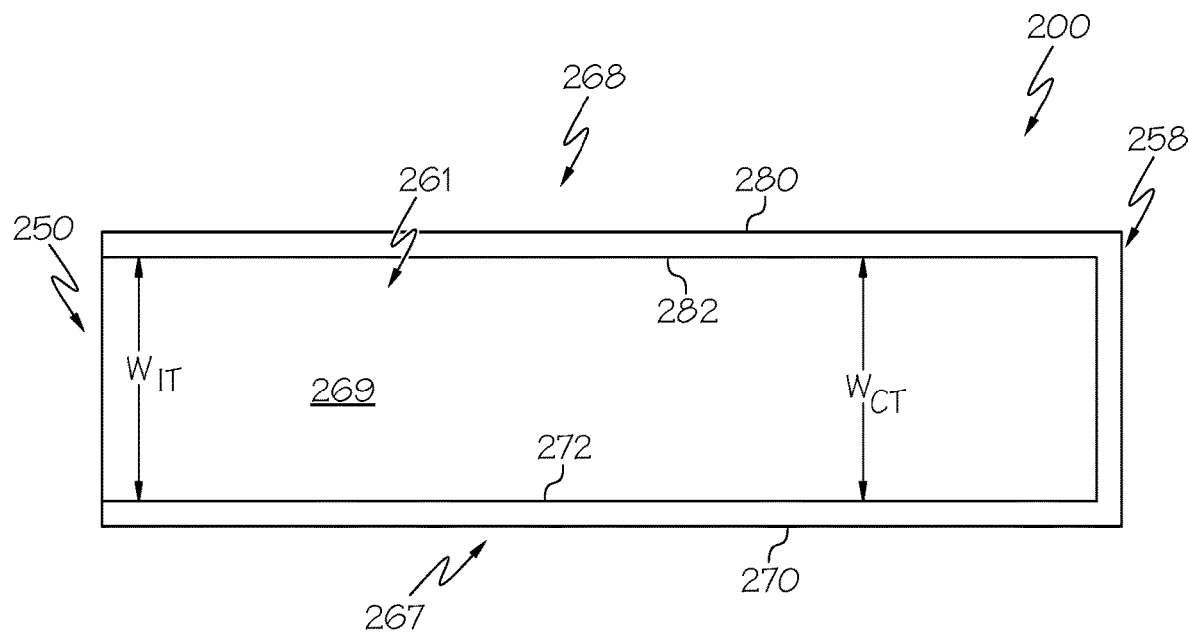
FIG. 14 schematically depicts a top view of a forming body according to one or more embodiments shown and described herein.

Referring now to FIGS. 11-14, in embodiments, the angle $\alpha_1$ between the base 269 of the trough 261 and the interior surface 272 of the first weir 267 is constant between an inlet end 250 of the forming body 200 and an outlet end of the forming body 200. Similarly, the angle $\alpha_2$ between the base 269 of the trough 261 and the interior surface 282 of the second weir 268 is constant between an inlet end 250 of the forming body 200 and compression end 258 of the forming body 200. As such, the width $W_{IT}$ of the trough 261 between the top of the first weir 267 and the top of the second weir 268 proximate to the inlet end 250 of the forming body 200 is substantially equal to the width $W_{CT}$ of the trough 261 between the top of the first weir 267 and the top of the second weir 268 proximate to the compression end 258 of the forming body 200 as depicted in FIG. 14.

Figure 15:
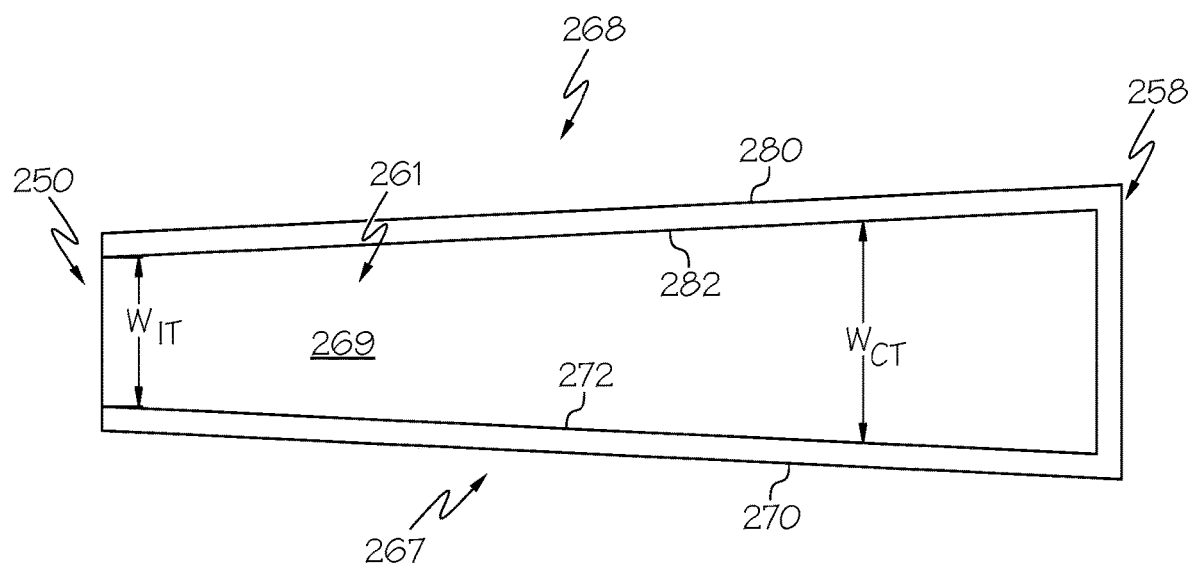
FIG. 15 schematically depicts a top view of a forming body according to one or more embodiments shown and described herein.

Referring now to FIGS. 11-13 and 15, it has been determined that the outward bowing of the weirs 267, 268 of the forming body 200 generally occurs in the first ⅓ of the length L of the forming body 200 from the inlet end 250, as described hereinabove. Accordingly, in some embodiments, the forming body 200 is constructed such that the angles $\alpha_1$, $\alpha_2$ of the interior surfaces 272, 282 of the first weir 267 and the second weir 268 with respect to the base 269 of the trough 261 are relatively smaller proximate to the inlet end 250 of the forming body 200 than proximate to the compression end 258 of the forming body 200. That is, the weirs 267, 268 of the forming body 200 are constructed to compensate for the outward bowing of the weirs where the outward bowing is most pronounced. For example, proximate the inlet end 50 of the forming body 200 the angles $\alpha_1$, $\alpha_2$ of the interior surfaces 272, 282 of the first weir 267 and the second weir 268 with respect to the base 269 of the trough 261 may be less than 90° while proximate the compression end 58 of the forming body the angles $\alpha_1$, $\alpha_2$ of the interior surfaces 272, 282 of the first weir 267 and the second weir 268 with respect to the base 269 of the trough 261 may be, for example, 90°. As such, the width $W_{IT}$ of the trough 261 between the top of the first weir 267 and the top of the second weir 268 at the inlet end 250 of the forming body 200 is less than the width $W_{CT}$ of the trough 261 between the top of the first weir 267 and the top of the second weir 268 at the compression end 258 of the forming body 200 as depicted in FIG. 15. Constructing the forming body 200 in this manner compensates for the outward bowing of the weirs 267, 268 in the portion of the weirs 67, 68 most susceptible to bowing and, as a result, increases the service life of the forming body 60.

While FIG. 15 depicts the width $W_{IT}$ of the trough 261 between the top of the first weir 267 and the top of the second weir 268 at the inlet end 250 of the forming body 200 is less than the width $W_{CT}$ of the trough 261 between the top of the first weir 267 and the top of the second weir 268 at the compression end 258 of the forming body 200, it should be understood that other geometries are contemplated and possible. For example, in alternative embodiments (not shown), the angles $\alpha_1$, $\alpha_2$ of the interior surfaces 272, 282 of the first weir 267 and the second weir 268 with respect to the base 269 of the trough 261 may be relatively smaller at a point between the inlet end 50 and the compression end 58 than at either the inlet end 50 or the compression end 58 of the forming body. As a result, the width $W_{IT}$ of the trough 261 between the top of the first weir 267 and the top of the second weir 268 at the inlet end 250 of the compression end 258 of the forming body 200 may be greater than the width $W_{CT}$ of the trough 261 between the top of the first weir 267 and the top of the second weir 268 at a point between the inlet end 250 and the compression end 258 of the forming body 200.

While different embodiments of structures for mitigating the onset of the outward bowing of the weirs of a forming body have been described herein, it should be understood that these embodiments may be used individually or in various combinations with one another to enhance mitigation of the onset of the outward bowing of the weirs of the forming body. For example and without limitation, the inwardly curved vertical surfaces of the forming body may be used in conjunction with any combination of the inwardly angled weirs, the secondary trough, the yoke block, or the weirs having inlet end faces with increased thicknesses. Similarly, the secondary trough may be used in conjunction with any combination of the inwardly curved vertical surfaces of the forming body, the inwardly angled weirs, the yoke block, or the weirs having inlet end faces with increased thicknesses. The yoke block may be used in conjunction with any combination of the inwardly curved vertical surfaces of the forming body, the inwardly angled weirs, the secondary trough, or the weirs having inlet end faces with increased thicknesses. The weirs having inlet end faces with increased thicknesses may be used in conjunction with any combination of the inwardly curved vertical surfaces of the forming body, the inwardly angled weirs, the secondary trough, or the yoke block.

EXAMPLES

The embodiments described herein will be further clarified by the following examples, each of which is based on a mathematical model of a forming body constructed from zircon and having a length of 116 inches (45.7 cm). In each example, the maximum amount of weir outward bowing (referred to in the examples as "weir spreading") is calculated after 28 months of operation at a constant temperature distribution. In the models, a yoke block assembly at the inlet end of the forming body was simulated by a "gap" condition in which the portions of the weirs that would be restricted from movement by the yoke block assembly were modeled to move by no more than an amount corresponding to the thermal expansion of the zircon material.

Example 1

The maximum weir spreading $U_{max}$ was modeled for a forming body having a configuration as depicted in FIGS. 10C and 10D (i.e., the inner and outer vertical surfaces of the weirs are substantially planar). Specifically, the maximum weir spreading $U_{max}$ was calculated for a constant compressive force applied to the inlet end faces of the weirs at different distances h from the outer vertical surface of the weirs 67, 68. The maximum weir spreading $U_{max}$ is graphically depicted in FIG. 16 as a function of the distance h from the outer vertical surface of the weirs 67, 68.

Figure 16:
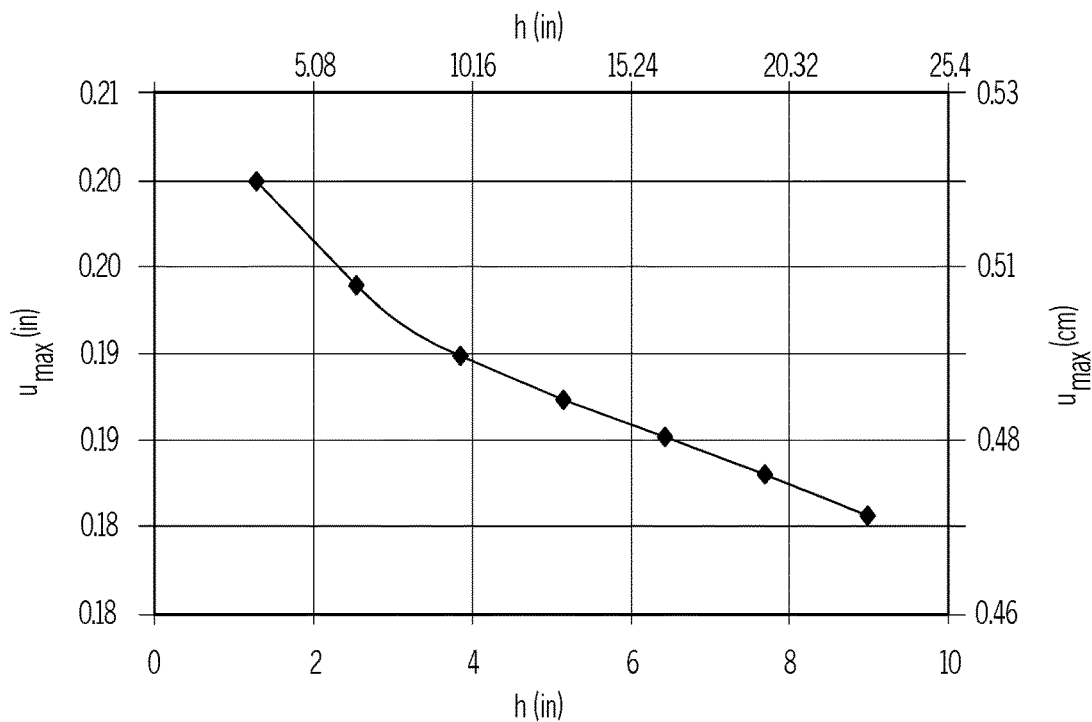
FIG. 16 graphically depicts the maximum weir spreading (y-axis) as a function of the distance h (x-axis) from the outer vertical surface of the weirs that a compressive force is applied.

As shown in FIG. 16, the maximum weir spreading $U_{max}$ decreases as the distance h increases. This generally indicates that applying the compressive force further from the outer vertical surface of the weirs of the forming body and away from the centerline of the trough increases the magnitude of the bending moment that counteracts weir spreading which, in turn, decreases the maximum amount of weir spreading $U_{max}$ that occurs for a fixed period of time.

Example 2

The maximum weir spreading $U_{max}$ was modeled for a forming body having a configuration as depicted in FIGS. 10C and 10D (i.e., the inner and outer vertical surfaces of the weirs are substantially planar) as a function of the applied compressive force. The compressive force was applied to the inlet end face at a distance h of 2.5 inches (6.35 centimeters) from the outer vertical surface of the weir. Specifically, the maximum weir spreading $U_{max}$ was calculated for compressive forces from 0 lbf to 1000 lbf (453.59 kgf) applied to the end face at a distance h of 2.5 inches (6.35 centimeters) from the outer vertical surface of a weir 67. The maximum weir spreading $U_{max}$ is graphically depicted in FIG. 17 as a function of the applied compressive force.

Figure 17:
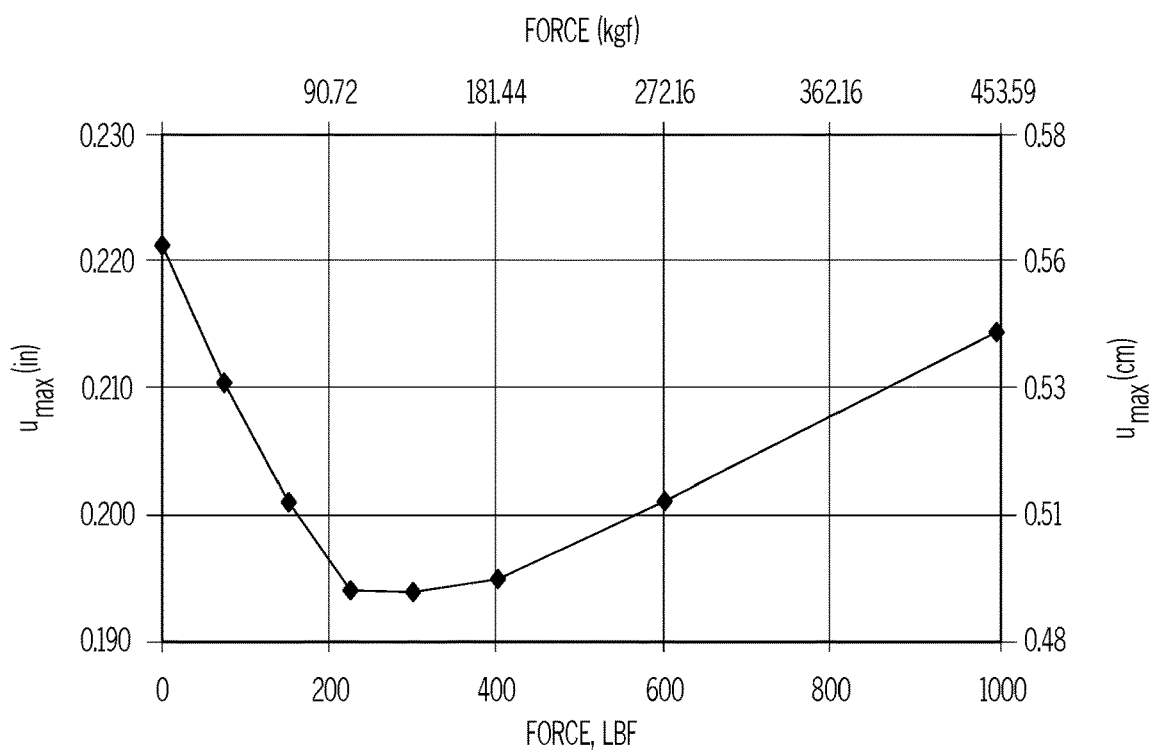
FIG. 17 graphically depicts the maximum weir spreading (y-axis) as a function of the compressive force (x-axis) applied at a distance h of 2.5 inches (6.35 centimeters) from the outer vertical surface of a weir.

As shown in FIG. 17, the maximum weir spreading $U_{max}$ decreases with increasing compressive force up to a certain value of compressive force which, for the geometry of the forming body of Example 2, was approximately 200 lbf (90.72 kgf). As the compressive force is further increased, the maximum weir spreading $U_{max}$ gradually increased, indicating there is an optimal amount of compressive force that may be applied to the weirs to minimize weir spreading when the weirs are constructed without a pre-curvature.

Example 3

The maximum weir spreading $U_{max}$ was modeled for a forming body having inlet end faces with increased thicknesses as depicted in FIGS. 10C and 10D but with the weirs of the forming body having a pre-curvature as depicted in FIG. 3 (i.e., both the inner and outer vertical surfaces of the weirs are curved inward towards the centerline of the trough). The curved portions of the weirs were positioned between the inlet end and a midpoint of the length of the forming body, as depicted in FIGS. 5A and 5B. The compressive force was applied to the inlet end face at a distance h of 2.5 inches (6.35 centimeters) from the outer vertical surface of the weir. Specifically, the maximum weir spreading $U_{max}$ was calculated for compressive forces from 0 lbf to 2000 lbf (907.18 kgf) applied at a distance h of 2.5 inches (6.35 centimeters) from the outer vertical surface of a weir 67. The maximum weir spreading $U_{max}$ is graphically depicted in FIG. 18 as a function of the applied compressive force.

Figure 18:
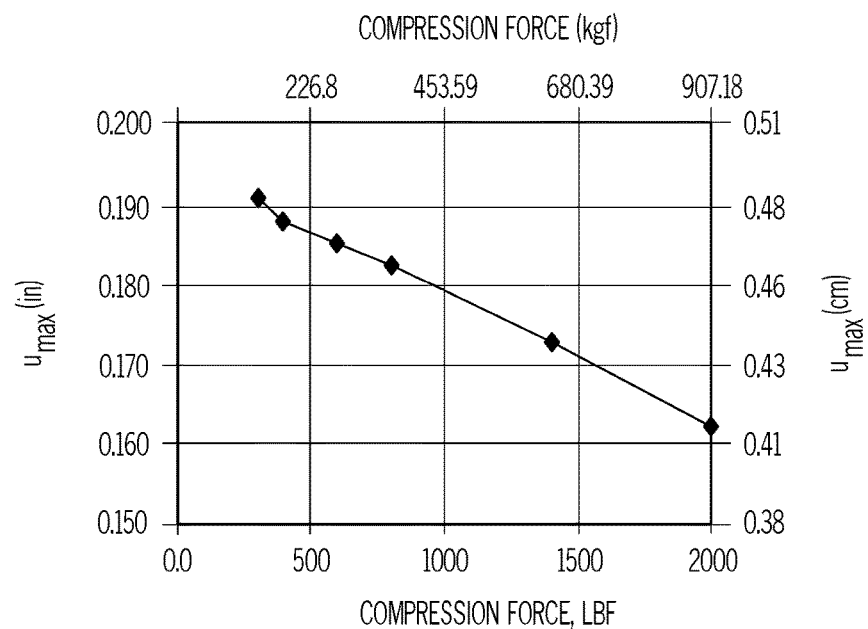
FIG. 18 graphically depicts the maximum weir spreading (y-axis) as a function of the compressive force (x-axis) applied at a distance h of 2.5 inches (6.35 centimeters) from the outer vertical surface of a weir in which the inner and outer vertical surfaces have a pre-curvature with an amplitude of curvature of 0.5 inches (1.27 centimeters)

As shown in FIG. 18, the maximum weir spreading $U_{max}$ decreases linearly with increasing applied compressive force when the weirs of the forming body are formed with a pre-curvature. This data generally indicates that the use of a compressive force to counteract the outward bowing of the weirs may be more effective when used in conjunction with weirs having a pre-curvature as depicted in FIGS. 3 and 5A-5B, particularly when the amplitude A of the curvature is greater than a certain threshold. For example, in the modeled examples, the compressive force is effective to counteract the weir spreading when the amplitude of curvature of the weirs is greater than or equal to 0.35 inches (0.889 centimeter). However, for the modeled examples, if the amplitude of curvature is less than 0.35 inches (0.889 centimeter), the decrease in weir spreading is akin to what is shown in FIG. 17 in which the compressive force can be "tuned" to minimize weir spreading. That is, when the amplitude of curvature of the weirs is less than or equal to 0.35 inches (0.889 centimeter), there is an applied compressive force that minimizes the weir spreading that occurs. For example, in the modeled results of FIG. 17, the applied compressive force that minimizes weir spreading is greater than 200 lbf (90.71 kgf) and less than about 300 lbf (136.1 kgf). For compressive forces outside of this range, weir spreading occurs.

Example 4

The maximum weir spreading $U_{max}$ was modeled for a forming body having inlet end faces with increased thicknesses as depicted in FIGS. 10C and 10D but with the weirs of the forming body having a pre-curvature as depicted in FIG. 3 (i.e., both the inner and outer vertical surfaces of the weirs are curved inward towards the centerline of the trough). The curved portions of the weirs were positioned between the inlet end and a midpoint of the length of the forming body, as depicted in FIGS. 5A and 5B. The maximum weir spreading $U_{max}$ was modeled for different amplitudes of curvature A from 0 to 1 with a compressive force applied at the inlet end face a distance h of 3.0 inches (7.62 centimeters) from the outer vertical surface of the weir. The compressive force was also varied from 0 lbf to 1500 lbf (680.39 kgf). The maximum weir spreading $U_{max}$ is graphically depicted in FIG. 19 as a function of the amplitude of curvature A of the weirs.

Figure 19:
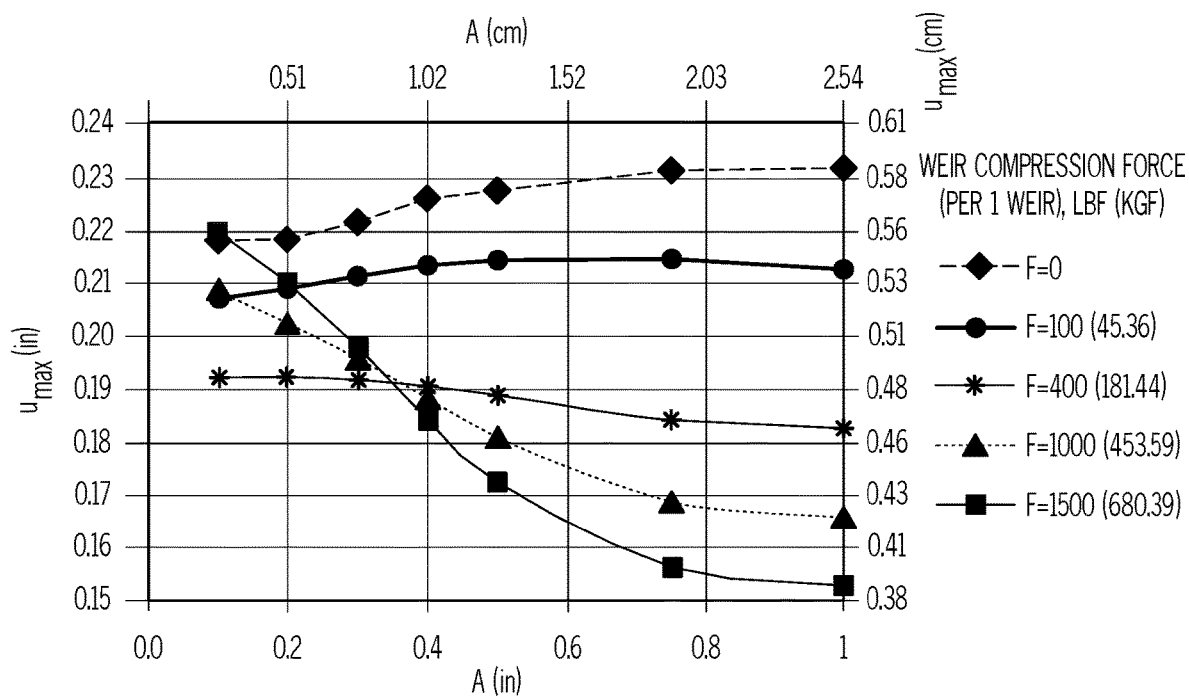
FIG. 19 graphically depicts the maximum weir spreading (y-axis) as a function of the amplitude of curvature (x-axis) of the weir for different values of compressive forces applied at a distance h of 3.0 inches (7.62 centimeters) from the outer vertical surface of a weir.

As shown in FIG. 19, for the specific geometry of the forming body in the models, applied compressive forces from 0 lbf to less than 400 lbf (181.44 kgf) resulted in an increase in the weir spreading for increasing amplitudes of curvature. For some intermediate values of applied compressive force from 300 lbf (136.1 kgf) to less than 400 lbf (181.44 kgf) (e.g., 350 lbf (158.76 kgf)), the weir spreading remained constant for any value of the amplitude of curvature. In these models, applied compressive forces greater than approximately 400 lbf (181.44 kgf) resulted in a decrease in the weir spreading with increasing amplitudes of curvature. The data of FIG. 19 indicate that, for the particular forming body configuration, increases in the compressive forces reduce the maximum weir spreading when the amplitude A of the curvature is greater than 0.35 inches (0.889 centimeter).

Figure 20:
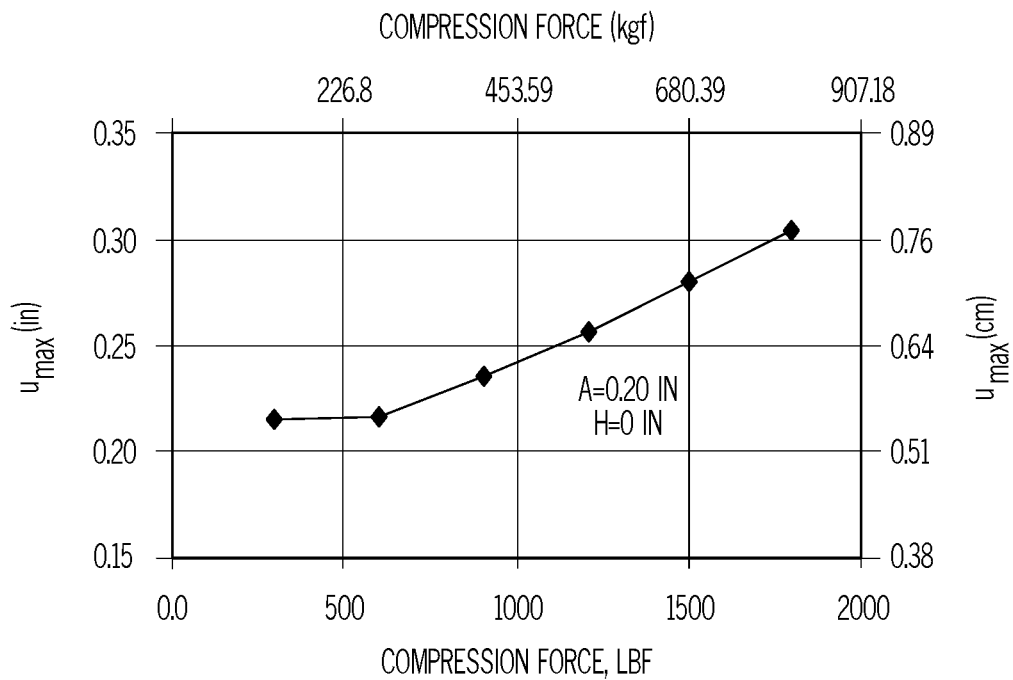
FIG. 20 graphically depicts the maximum weir spreading (y-axis) as a function of the compressive force (x-axis) applied along the outer vertical surface of a weir in which the inner and outer vertical surfaces have a pre-curvature with an amplitude of curvature of 0.2 inches (0.508 centimeter)

For example, FIG. 20 graphically depicts the maximum wear spreading $U_{max}$ as a function of applied compressive force for a forming body having pre-curved weirs as depicted in FIGS. 5A and 5B with an amplitude of curvature A of 0.20 inches (0.508 centimeter). The compressive force is applied on the inlet end face immediately adjacent to the outer vertical surface of the weir (i.e., h=0). As shown in FIG. 20, increasing the magnitude of the applied compressive force actually increases the maximum wear spreading $U_{max}$.

Figure 21:
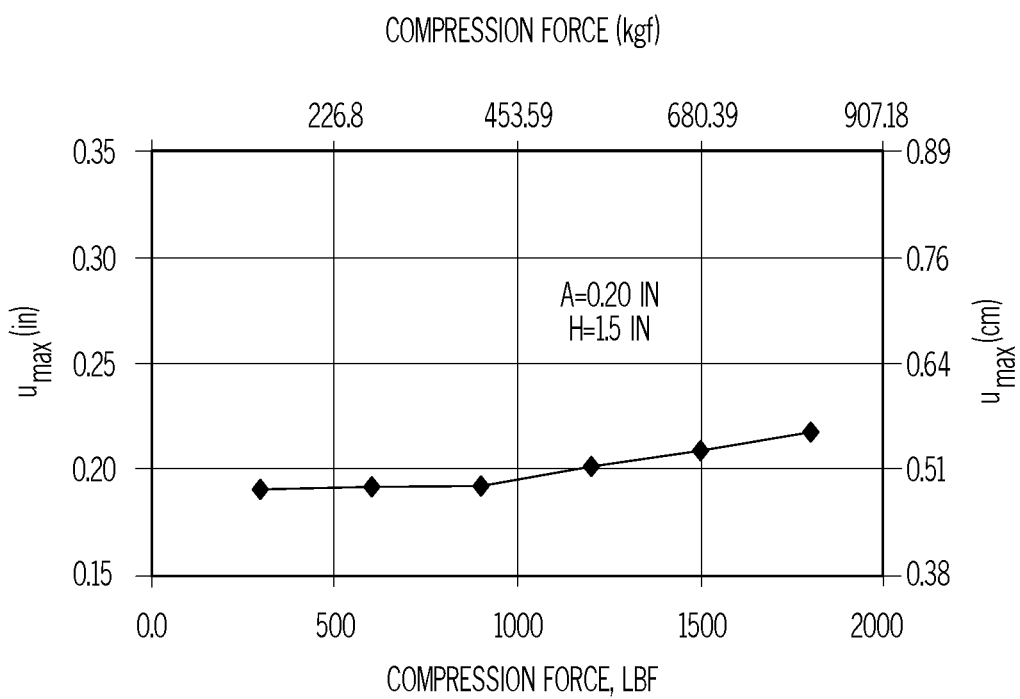
FIG. 21 graphically depicts the maximum weir spreading (y-axis) as a function of the compressive force (x-axis) applied at a distance h of 1.5 inches (3.81 centimeters) from the outer vertical surface of a weir in which the inner and outer vertical surfaces have a pre-curvature with an amplitude of curvature of 0.2 inches (0.508 centimeter)

Similarly, FIG. 21 graphically depicts the maximum wear spreading $U_{max}$ as a function of applied compressive force for a forming body having inlet end faces with increased thicknesses as depicted in FIGS. 10C and 10D but with the weirs of the forming body having a pre-curvature as depicted in FIGS. 5A and 5B with an amplitude of curvature A of 0.20 inches (0.508 centimeter). The compressive force is applied to the inlet end face at a distance h of 1.5 inches (3.81 centimeters) from the outer vertical surfaces of the weirs. As shown in FIG. 21, increasing the magnitude of the applied compressive force actually increases the maximum wear spreading $U_{max}$ despite the pre-curvature of the weirs.

Figure 22:
FIG. 22 graphically depicts the maximum weir spreading (y-axis) as a function of the compressive force (x-axis) applied at a distance h of 3.0 inches (7.62 centimeters) from the outer vertical surface of a weir in which the inner and outer vertical surfaces have a pre-curvature with an amplitude of curvature of 0.35 inches (0.889 centimeter)

By way of contrast, FIG. 22 graphically depicts the maximum wear spreading $U_{max}$ as a function of applied compressive force for a forming body having inlet end faces with increased thicknesses as depicted in FIGS. 10C and 10D but with the weirs of the forming body having a pre-curvature as depicted in FIGS. 5A and 5B with an amplitude of curvature A of 0.35 inches (0.889 centimeter). The compressive force is applied to the inlet end face at a distance h of 3.0 inches (7.62 centimeters) from the outer vertical surfaces of the weirs. As shown in FIG. 22, increasing the magnitude of the applied compressive force to greater than 1000 lbF (453.59 kgf) actually decreases the maximum wear spreading $U_{max}$ when the amplitude of curvature A of the weirs is 0.35 inches (0.889 centimeter) or greater.

Example 5

The maximum weir spreading $U_{max}$ was modeled as a function of the applied compressive force on the inlet end face for different distances h from the outer vertical surface of a weir (specifically h=0, 3 inches (7.62 centimeters), and 8 inches (20.32 centimeters)) for a forming body having pre-curved weirs as depicted in FIGS. 5A and 5B with an amplitude of curvature of 0.75 inches (1.905 centimeters) and with thickened inlet faces as depicted in FIGS. 10C and 10D. The maximum weir spreading $U_{max}$ was also modeled as a function of the applied compressive force for a distance h=8 inches (20.32 centimeters) from the outer vertical surface of a weir for a forming body having pre-curved weirs as depicted in FIGS. 5A and 5B with an amplitude of curvature of 0.15 inches (0.381 centimeter) and with thickened inlet faces as depicted in FIGS. 10C and 10D. The data is graphically depicted in FIG. 23.

Figure 23:
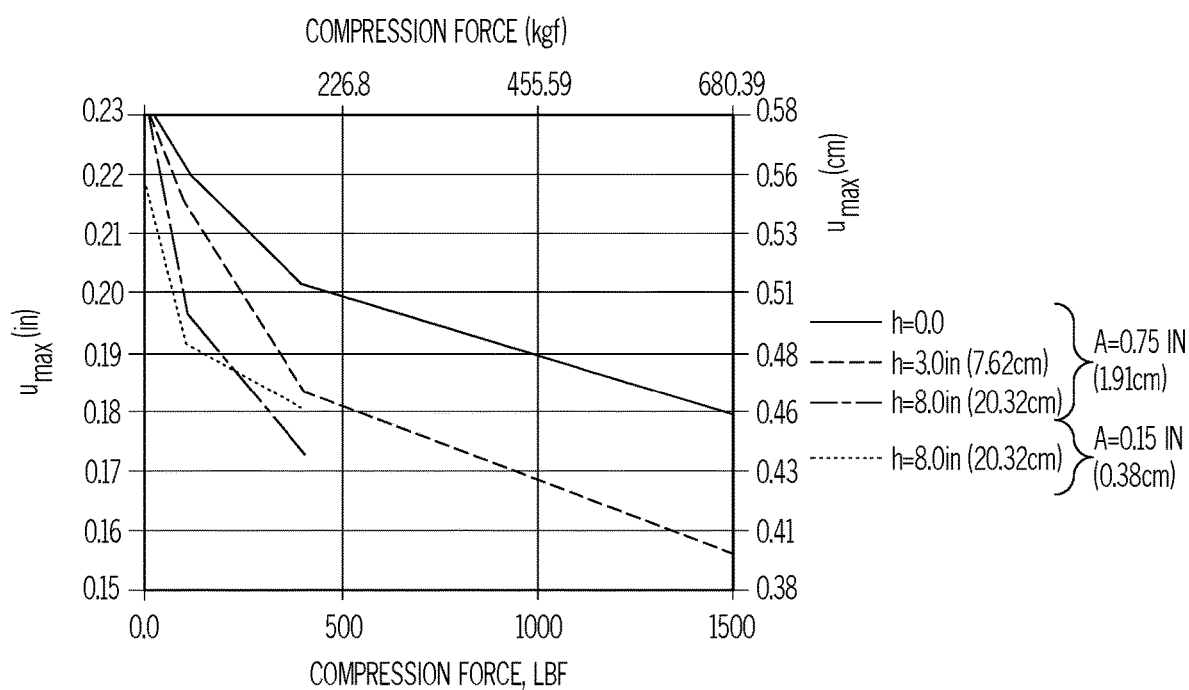
FIG. 23 graphically depicts the maximum weir spreading (y-axis) as a function of the applied compressive force (x-axis) for different values of the distance h from the outer vertical surface of a weir for two different amplitudes of curvature of the weir.

As shown in FIG. 23, the maximum weir spreading generally decreases as the point at which the compressive force is applied to the inlet end face of the wear increases from the outer vertical surface of the weir. That is, the maximum weir spreading generally decreases as the distance h from the outer vertical surface of the weir increases. This indicates that, for a given compressive force, larger bending moments can be achieved when the compressive force is applied further from the outer vertical surface of the weir.

Example 6

Figure 24:
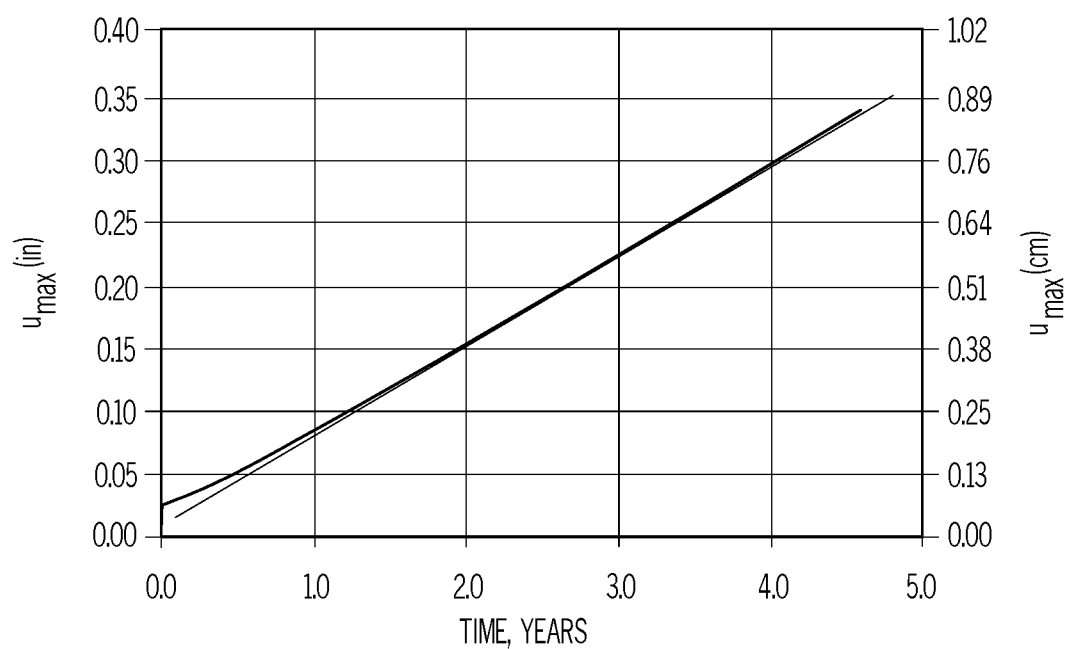
FIG. 24 graphically depicts the maximum weir spreading (y-axis) as a function of time.

The maximum weir spreading $U_{max}$ was modeled as a function of time for a forming body having inlet end faces with increased thicknesses as depicted in FIGS. 10C and 10D but with the weirs of the forming body having a pre-curvature as depicted in FIGS. 5A and 5B with an amplitude of curvature A of 0.7 inches (1.778 centimeters). The compressive force is applied to the inlet end face at a distance h of 0.7 inches (1.778 centimeters) from the outer vertical surfaces of the weirs with a magnitude of 800 lbf (362.87 kgf). The results of the model are graphically depicted in FIG. 24 which generally shows the weir spreading is substantially linear over time.

Comparative Example 1

An uncompensated forming body (i.e., a forming body without inwardly curved or angled weirs) was mathematically modeled to investigate the effect of the outward bowing of the weirs on the distribution of glass flowing from the trough and over the weirs of the forming body over time. The uncompensated forming body was modeled as a zircon forming body with a length of 150 inches (3.8 meters), a trough having a depth of 12 inches (30.48 cm), and weirs with an initial angle of 90° with respect to the base of the trough (i.e., the weirs were initially vertical). The glass flow over the weirs (in lbs/hr/inch of forming body length) was modeled for outward bowing of the weirs at 1 year (1×) and 5 years (5×) of operation. The results are graphically depicted in FIG. 25 which shows the change in glass flow (y-axis) as a function of the length of the forming body from the inlet end.

Figure 25:
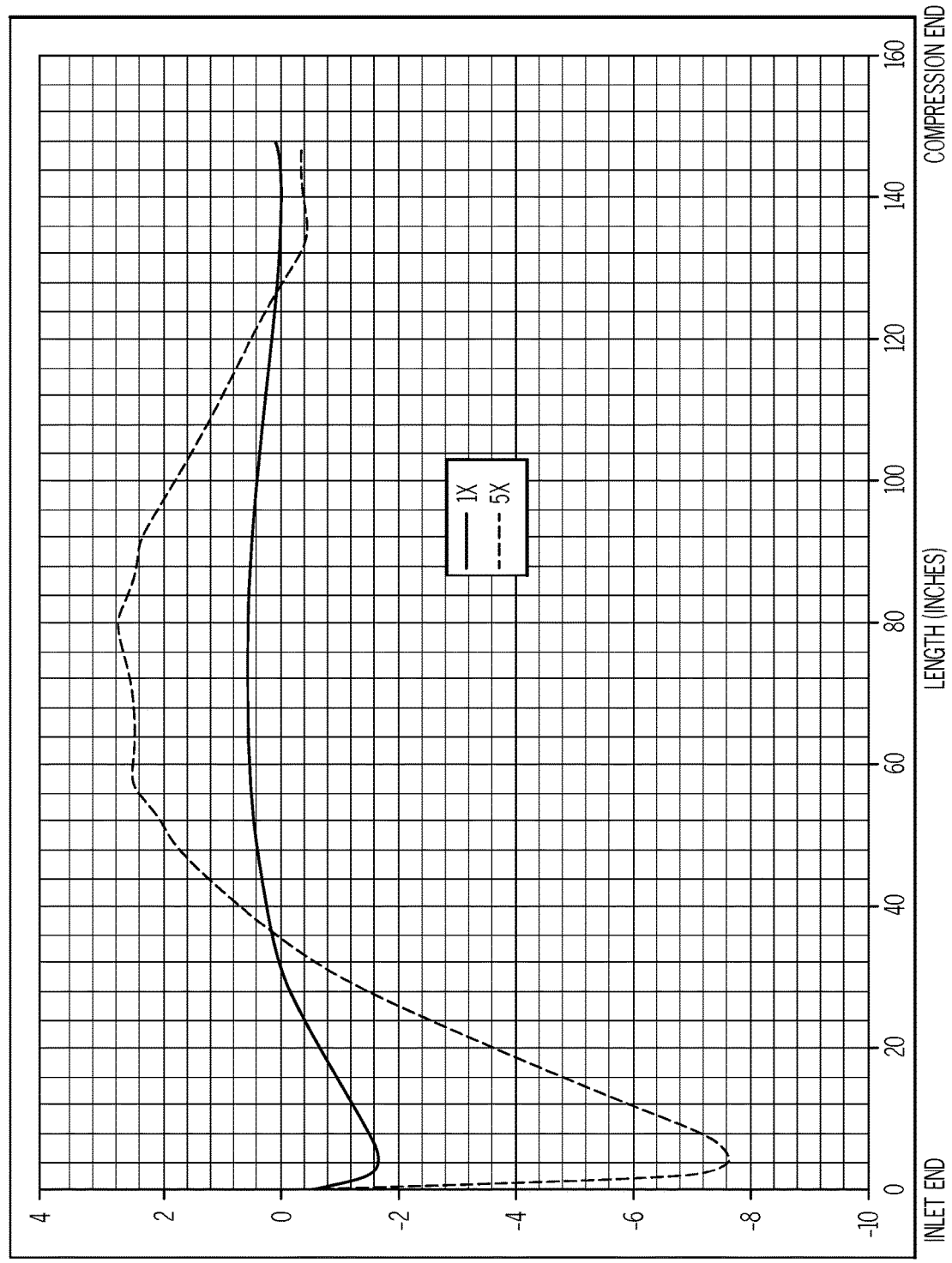
FIG. 25 graphically depicts the change in glass flow distribution (y-axis) over the weirs of an uncompensated forming body as a function of length (x-axis) of the forming body.

The data in FIG. 25 shows that the glass flow over the weirs proximate the center of the length of the forming body increased from 1 year to 5 years of operation while the glass flow over the weirs proximate the inlet end of the forming body decreased from 1 year to 5 years of operation. This change in the glass flow over the weirs is believed to be due to the outward bowing of the weirs. Specifically, the data demonstrates that the decrease in the glass flow proximate the inlet end of the forming body occurs in the first ⅓ of the length of the forming body from the inlet end which generally coincides with the portion of the forming body where the outward bowing of the weirs is most pronounced as determined through empirical observations of actual forming bodies.

Example 7

Figure 26:
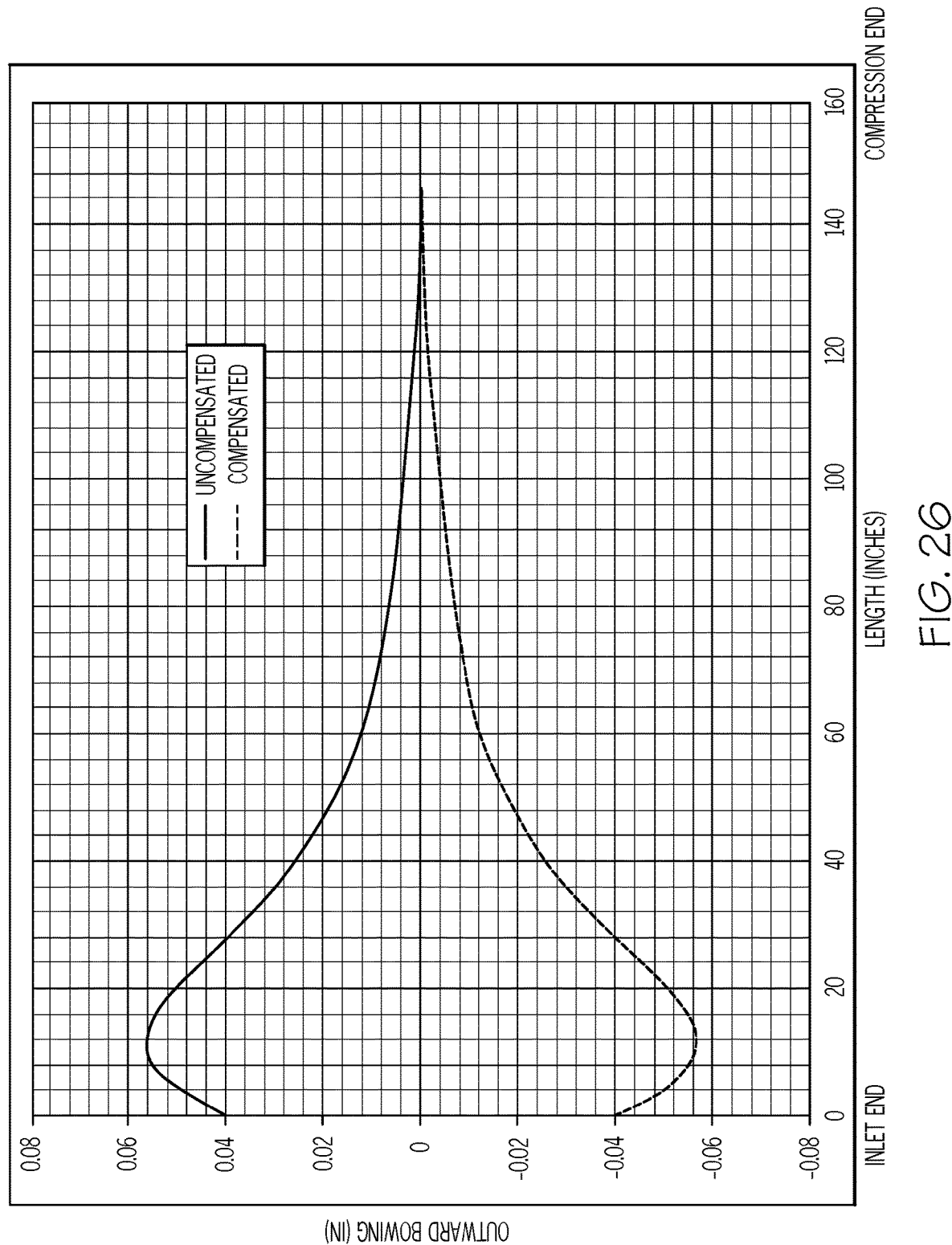
FIG. 26 graphically depicts the outward bowing (y-axis) of weirs of a forming body as a function of length (x-axis) for an uncompensated forming body (solid line) after 1 year of operation and a proposed compensation geometry (dashed line) for offsetting the creep in the weirs of the uncompensated forming body.

FIG. 26 graphically depicts a model of the amount of outward bowing of the weirs (y-axis) that occurs in the uncompensated forming body of Comparative Example 1 as a function of the length of the forming body (x-axis) after 1 year of operation (solid line) and a theoretical compensation geometry (dashed line) for addressing the outward bowing of the weirs. As shown in FIG. 26, the maximum amount of outward bowing occurs in approximately the first ⅓ of the length of the forming body from the inlet end. To compensate for this outward bowing, the weirs of the forming body may be inwardly angled along the length of the forming body by an amount equal (and opposite) to the outward bowing, as depicted by the dashed line. For example, at 20 inches (50.8 cm) from the inlet end of the forming body, the weirs of the uncompensated forming body are outwardly bowed by approximately 0.05 inch (0.127 cm) after 1 year of operation. To offset this outward bowing and prolong the service life of the forming body, the forming body may be initially constructed with inwardly angled weirs such that, at 20 inches (50.8 cm) from the inlet end of the forming body, the top of the weir is displaced by 0.05 inch (0.127 cm) towards a centerline of the forming body, similar to the embodiment of a forming body depicted in FIG. 11. That is, the inwardly angled orientation of the weirs mirror the outward bowing that occurs in the uncompensated forming body. It is believed that this compensation geometry would result in the weirs of the forming body being approximately parallel after 1 year of operation and the weirs having an outward bow substantially the same as the uncompensated forming body (1 year of operation) after 2 years of operation of the compensated forming.

Figure 27:
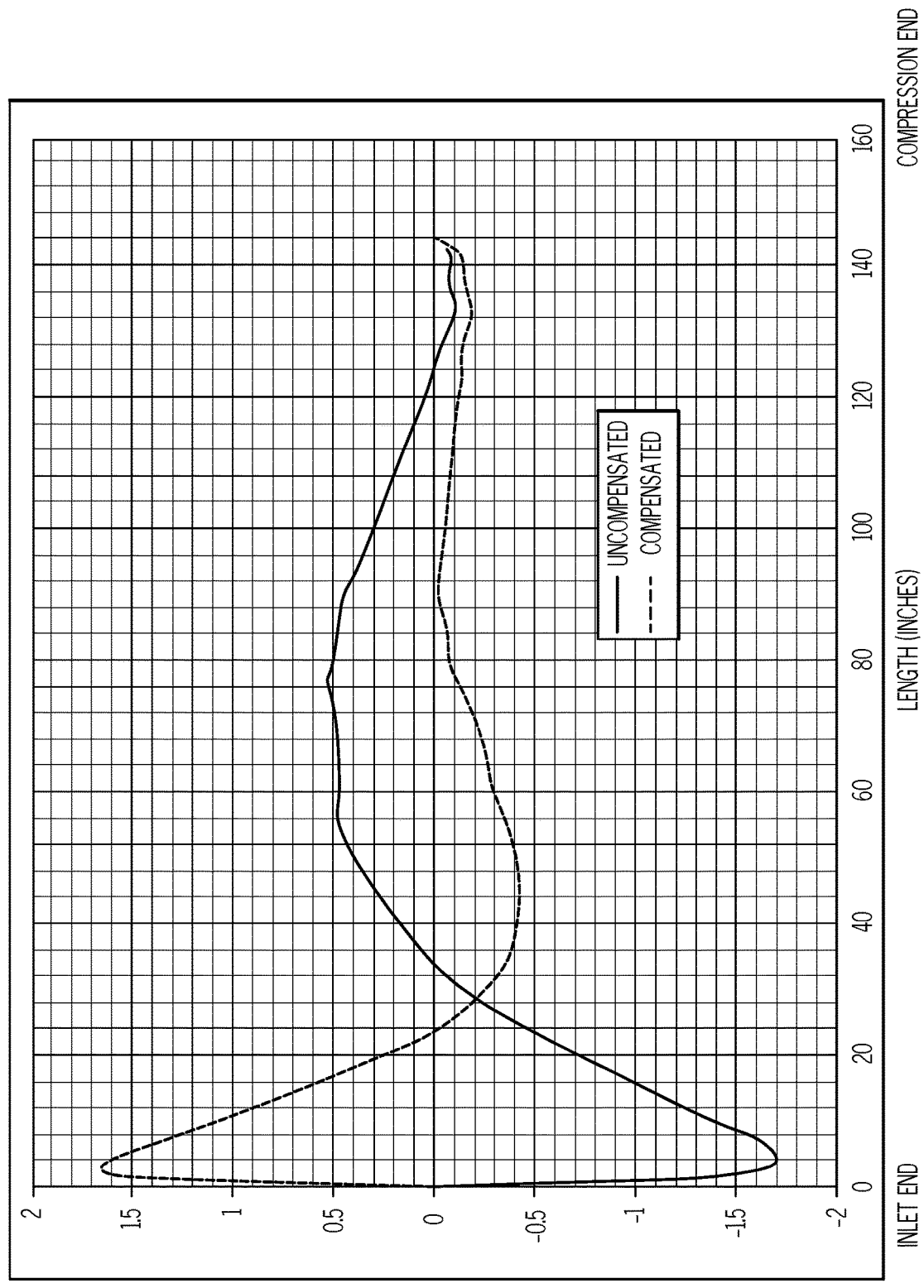
FIG. 27 graphically depicts the change in glass flow distribution (y-axis) as a function of length (x-axis) for an uncompensated forming body at 1 year of operation and for a compensated forming body at 0 years of operation.

FIG. 27 graphically depicts a model of the glass flow over the weirs of the uncompensated and compensated forming bodies of FIG. 26. It should be noted that the glass flow over the weirs of the uncompensated forming body is substantially the same as that depicted in FIG. 25. However, for the theoretical compensation geometry (dashed line) depicted in FIG. 26, the glass flow over the weirs is initially (i.e., at 0 years of operation) greater proximate the inlet end and generally more uniform across the balance of the length of the forming body than that of the uncompensated forming body after 1 year of operation. This data indicates that it is possible to adjust the flow of glass over the weirs of the forming body as a function of length by inwardly angling the weirs of the forming body, thereby improving the dimensional stability of the resultant glass ribbon while offsetting the creep of the weirs.

Example 8

Figure 28:
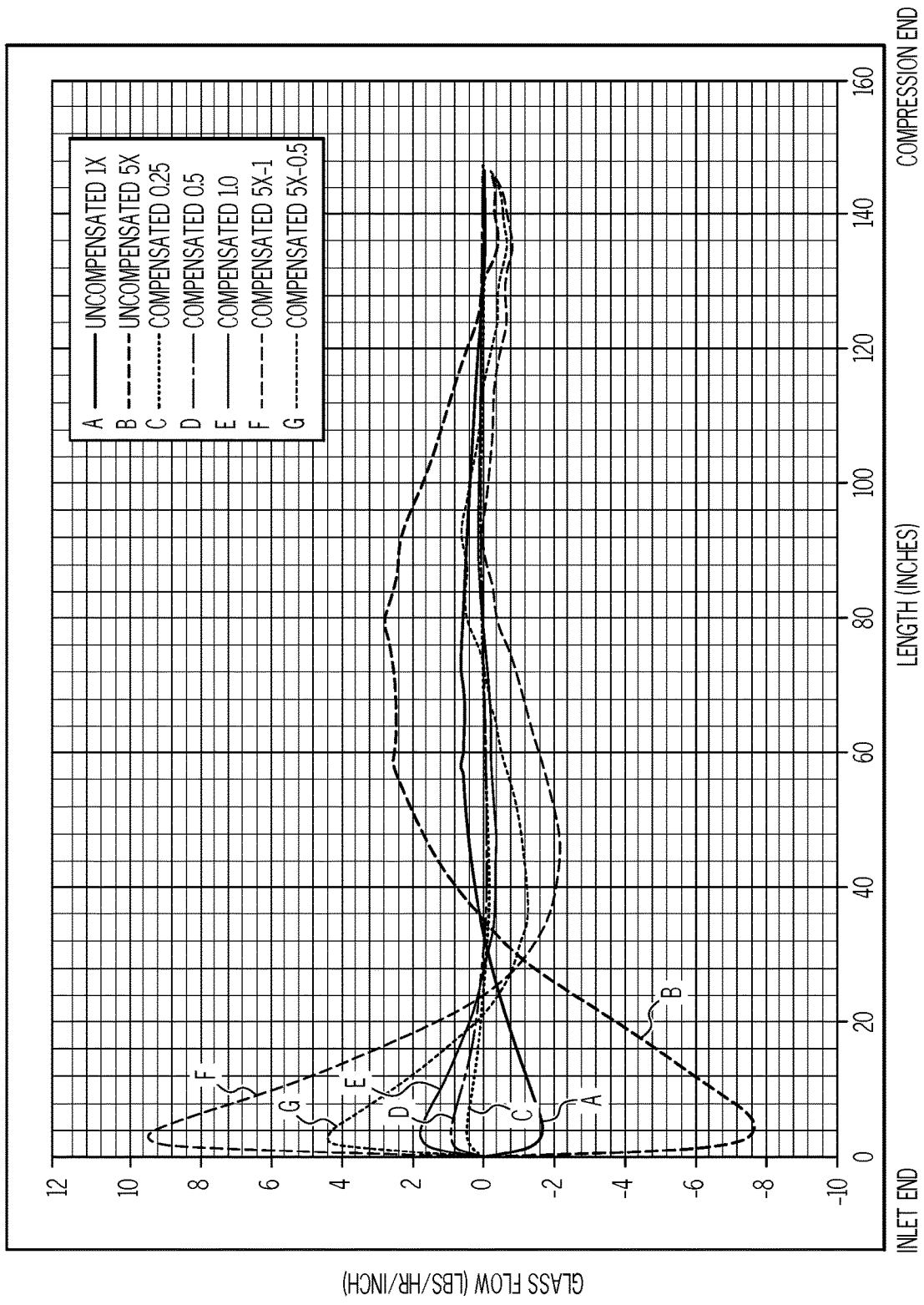
FIG. 28 graphically depicts the change in glass flow distribution (y-axis) as a function of length (x-axis) for uncompensated forming bodies at 1 year and 5 years of operation and for compensated forming bodies with different amounts of compensation and years of operation.

FIG. 28 graphically depicts the modeled glass flow distribution (y-axis) as function of the length of the forming body from the inlet end (x-axis) for an uncompensated forming body at 1 year and 5 years of operation and for compensated forming bodies with different amounts of initial compensation. Specifically, the compensated forming bodies were modeled with weirs which were inwardly angled by a factor of 0.25, 0.5, and 1 times the amount of outward bowing of the uncompensated forming body at 1 year of operation and weirs which were inwardly angled by a factor of 0.5 and 1 times the amount of outward bowing of the uncompensated forming body at 5 years of operation. The forming bodies were modeled as zircon forming bodies with a length of 150 inches (3.8 meters) and a trough having a depth of 12 inches (30.48 cm) at the inlet end. The data generally indicates that the amount of compensation can be selected to produce a more uniform glass flow distribution over the weirs of the forming body as a function of length while also extending the service life of the forming body by offsetting the creep of the weirs.

For example, the data of FIG. 28 generally indicates that initial compensation geometries having a factor of 0.25, 0.5, and 1 times the amount of outward bowing of the uncompensated forming body at 1 year of operation yield a substantially uniform glass flow distribution across the length of the forming body with the uniformity of the glass flow distribution improving with increasing distance from the inlet end of the forming body.

Example 9

Figure 29:
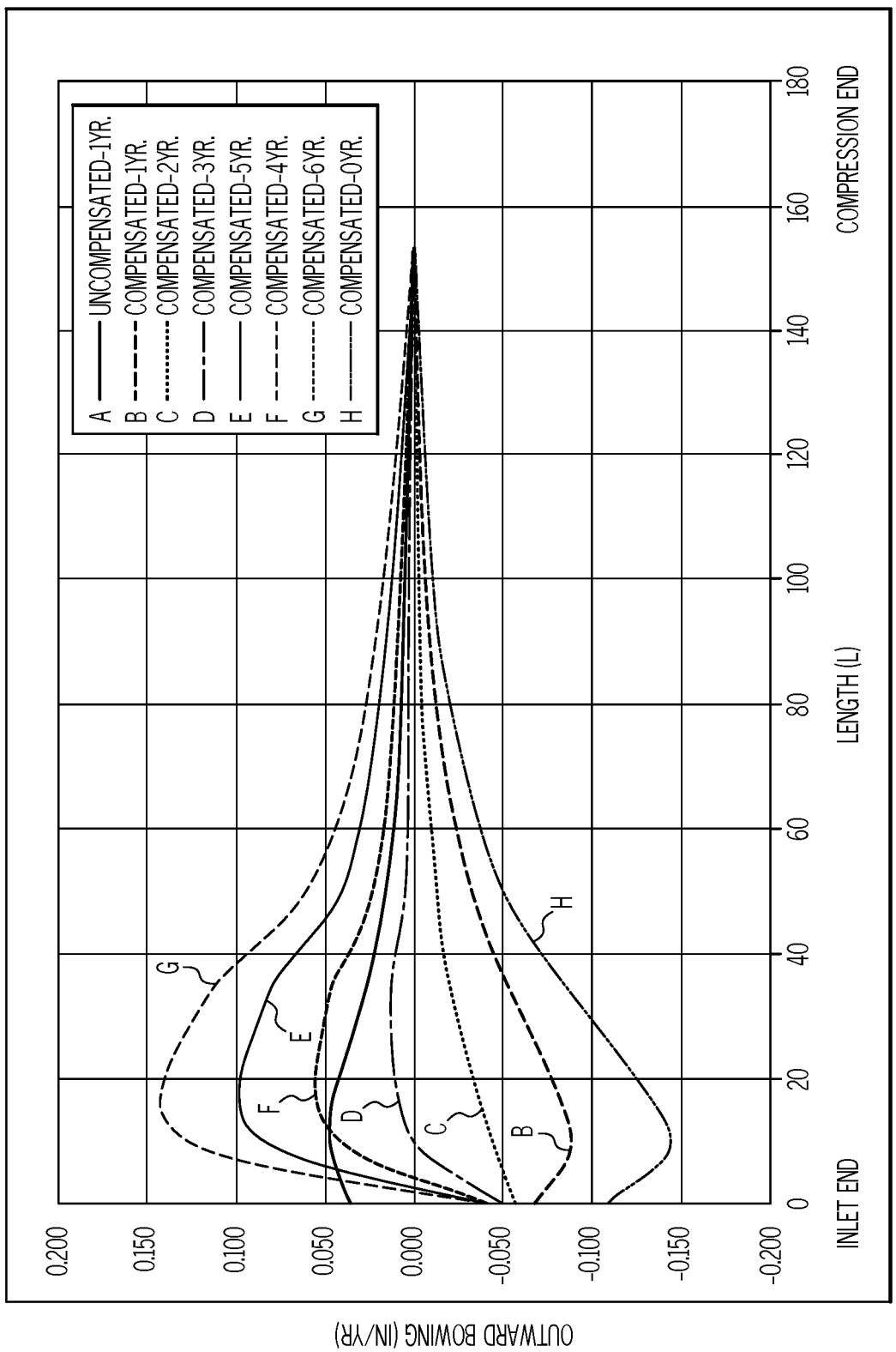
FIG. 29 graphically depicts the outward bowing of weirs of a forming body (y-axis) as a function of length of the forming body (x-axis) for a compensation geometry at 0, 1, 2, 3, 4, 5, and 6 years of operation and for an uncompensated forming body at 1 year of service.

FIG. 29 graphically depicts the modeled outward weir bowing (y-axis) as function of the length of the forming body from the inlet end (x-axis) for an uncompensated forming body at 1 year of operation and for a compensated forming body at 0, 1, 2, 3, 4, 5, and 6 years of operation. The amount of initial compensation of the compensated forming body was based on a calculated amount of outward weir bowing of an uncompensated forming body at 6 years of operation. The forming bodies were modeled as a zircon forming bodies with a length of 150 inches (3.8 meters) and a trough having a depth of 12 inches (30.48 cm).

The modeled data of FIG. 29 generally indicates that the selected compensation geometry (i.e., a geometry based on the outward weir bowing of an uncompensated forming body at 6 years of operation) can significantly offset the outward bowing of the weirs and thereby increase the service life of the forming body. Specifically, the data indicate at 4 years of operation the weirs of the compensated forming body have approximately the same amount of outward bowing as the uncompensated forming body at 1 year of operation. Assuming, for example, the maximum allowable outward bowing is 0.05 inch, the compensated forming body has a service life that is greater than 3 times the service life of the uncompensated forming body.

Based on the foregoing, it should now be understood that the embodiments described herein relate to forming bodies for use in glass forming apparatuses. The forming bodies described herein may be constructed to mitigate the onset of outward bowing of the weirs of the forming body due to material creep and the pressure of molten glass against the inner vertical surfaces of the weirs, thereby extending the service life of the forming bodies.

While various embodiments and techniques for mitigating the onset of outward bowing of the weirs of the forming bodies have been described herein, it should be understood it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A forming body of a glass forming apparatus comprising:
an upper portion;
a first forming surface and a second forming surface extending from the upper portion, the first forming surface and the second forming surface converging at a bottom edge of the forming body; and
a trough for receiving molten glass positioned in the upper portion of the forming body, the trough defined by a first weir, a second weir opposite from and spaced apart from the first weir, and a base extending between the first weir and the second weir, wherein:
at least a portion of a vertical surface of the first weir curves inward toward a centerline of the trough;
at least a portion of a vertical surface of the second weir curves inward toward the centerline of the trough; and
the vertical surfaces of the first and second weirs extend from tops of the first and second weirs, respectively, to the base.

2. The forming body of claim 1, wherein:
the vertical surface of the first weir is an inner vertical surface of the first weir, the first weir further comprising an outer vertical surface opposite the inner vertical surface of the first weir and at least a portion of the outer vertical surface of the first weir curves inward toward the centerline of the trough; and
the vertical surface of the second weir is an inner vertical surface of the second weir, the second weir further comprising an outer vertical surface opposite the inner vertical surface of the second weir and at least a portion of the outer vertical surface of the second weir curves inward toward the centerline of the trough.

3. The forming body of claim 2, wherein:
the portion of the inner vertical surface of the first weir and the portion of the outer vertical surface of the first weir that curve inward toward the centerline of the trough are located between a first end of the forming body and a midpoint of a length L of the upper portion of the forming body; and
the portion of the inner vertical surface of the second weir and the portion of the outer vertical surface of the second weir that curve inward toward the centerline of the trough are located between the first end of the forming body and the midpoint of the length L of the upper portion of the forming body.

4. The forming body of claim 1, wherein:
the vertical surface of the first weir is an inner vertical surface of the first weir and the first weir further comprises an outer vertical surface opposite the inner vertical surface of the first weir, wherein the outer vertical surface of the first weir is substantially planar; and
the vertical surface of the second weir is an inner vertical surface of the second weir and the second weir further comprises an outer vertical surface opposite the inner vertical surface of the second weir, wherein the outer vertical surface of the second weir is substantially planar.

5. The forming body of claim 4, wherein:
the portion of the inner vertical surface of the first weir that curves inward toward the centerline of the trough is located between a first end of the forming body and a midpoint of a length L of the upper portion of the forming body; and
the portion of the inner vertical surface of the second weir that curves inward toward the centerline of the trough is located between the first end of the forming body and the midpoint of the length L of the upper portion of the forming body.

6. The forming body of claim 1, wherein:
the vertical surface of the first weir is an outer vertical surface of the first weir and the first weir further comprises an inner vertical surface opposite the outer vertical surface of the first weir, wherein the inner vertical surface of the first weir is substantially planar; and
the vertical surface of the second weir is an outer vertical surface of the second weir and the second weir further comprises an inner vertical surface opposite the outer vertical surface of the second weir, wherein the inner vertical surface of the second weir is substantially planar.

7. The forming body of claim 6, wherein:
the portion of the outer vertical surface of the first weir that curves inward toward the centerline of the trough is located between a first end of the forming body and a midpoint of a length L of the upper portion of the forming body; and
the portion of the outer vertical surface of the second weir that curves inward toward the centerline of the trough is located between the first end of the forming body and the midpoint of the length L of the upper portion of the forming body.

8. The forming body of claim 1, wherein the trough is a first trough and the forming body further comprises a second trough positioned in the base of the first trough.

9. The forming body of claim 8, wherein the second trough extends from a first end of the forming body toward an opposite end of the forming body to a point that is less than or equal to a midpoint M of a length L of the forming body.

10. The forming body of claim 9, wherein the second trough extends from the first end of the forming body toward the opposite end of the forming body to a point that is less than or equal to ⅓ of the length L of the forming body.

11. The forming body of claim 1, further comprising a yoke block coupled to the first weir and the second weir and extending across the trough.

12. The forming body of claim 11, wherein the yoke block comprises first and second slots and the first weir and the second weir are positioned in the first slot and second slot, respectively.

13. The forming body of claim 11, further comprising a restraining block positioned on the yoke block, the yoke block positioned within a slot of the restraining block.

14. The forming body of claim 1, wherein the first weir and the second weir are compressed in a longitudinal direction of the forming body.

15. The forming body of claim 1, wherein:
a thickness of the first weir varies along a length of the forming body; and a thickness of the second weir varies along a length of the forming body.

16. The forming body of claim 15, wherein:
a first thickness of the first weir proximate a first end of the forming body is greater than a second thickness of the first weir at a midpoint of the forming body; and
a first thickness of the second weir proximate the first end of the forming body is greater than a second thickness of the second weir at the midpoint of the forming body.

17. The forming body of claim 16, wherein:
a transition from the first thickness of the first weir to the second thickness of the first weir comprises a radius; and
a transition from the first thickness of second first weir to the second thickness of the second weir comprises a radius.

18. The forming body of claim 1, wherein:
a thickness of the first weir varies along a vertical downward direction from the top of the first weir; and
a thickness of the second weir varies along the vertical downward direction from the top of the second weir.

19. The forming body of claim 18, wherein:
the thickness of the first weir decreases linearly in the downward vertical direction; and
the thickness of the second weir decreases linearly in the downward vertical direction.

20. The forming body of claim 1, wherein the vertical surfaces of the first and second weirs comprise planar portions extending from an inlet end of the forming body.

* * * * *